US006854116B1

(12) United States Patent
Anderson et al.

(10) Patent No.: US 6,854,116 B1
(45) Date of Patent: Feb. 8, 2005

(54) EXECUTION CONTROL FOR PROCESS TASK

(75) Inventors: Eric C. Anderson, San Jose, CA (US); Hugh B. Svendsen, Atlanta, GA (US)

(73) Assignee: Apple Computer, Inc., Cupertino, CA (US)

( * ) Notice: Subject to any disclaimer, the term of this patent is extended or adjusted under 35 U.S.C. 154(b) by 0 days.

(21) Appl. No.: 09/007,019

(22) Filed: Jan. 14, 1998

Related U.S. Application Data

(63) Continuation of application No. 08/478,413, filed on Jun. 7, 1995, now abandoned, which is a continuation of application No. 07/954,970, filed on Sep. 30, 1992, now Pat. No. 6,304,891.

(51) Int. Cl.[7] .................................................. G06F 9/00
(52) U.S. Cl. ........................................................ 718/100
(58) Field of Search ................................ 709/107, 102, 709/106, 104; 718/100, 102, 106, 104, 107

(56) References Cited

U.S. PATENT DOCUMENTS

| | | | | |
|---|---|---|---|---|
| 4,954,948 A | * | 9/1990 | Hira et al. ................... | 364/200 |
| 5,283,900 A | * | 2/1994 | Frankel et al. ............... | 395/700 |
| 5,325,526 A | * | 6/1994 | Cameron et al. ........... | 395/650 |
| 5,448,735 A | * | 9/1995 | Anderson et al. ........... | 395/650 |
| 5,553,309 A | * | 9/1996 | Asai et al. ................... | 395/854 |
| 6,304,891 B1 | * | 10/2001 | Anderson et al. ........... | 709/107 |

OTHER PUBLICATIONS

Digital Equipment Corporation, Open VMS I/O User's Reference Manual, Mar., 1994, pp. 3–16 to 3–17.*

* cited by examiner

Primary Examiner—Sue Lao
(74) Attorney, Agent, or Firm—Blakely, Sokoloff, Taylor & Zafman LLP

(57) ABSTRACT

Method and means for controlling the execution sequence of a first sequence of modules in a first task. The first sequence of modules are linked to one another and have at least one sequence of execution. The method stores in each of the first sequence of modules a skip value representing which of subsequent modules to execute. The method executes the first of the first sequence of said modules, and then executes the next of the modules indicated by the skip value. Conservation of processor bandwidth is accomplished by avoiding the loading of modules which will not be executed.

Method and means are further provided for simultaneous activation/deactivation of a set of tasks by a processor, each of the tasks normally executed in a sequential fashion by one or more processors. A list of tasks to be activated/deactivated is stored, including the timing relationship for the activation process. The list is then implemented as frame numbers for activation and requested state in the actual task list. The executing processor compares the requested state to the actual state for each task, and if different, compares the value of the activation frame with the current frame. If the current frame equals or exceeds the activation frame, then the requested active state is transferred to the actual state.

26 Claims, 18 Drawing Sheets

Execution Path: 1401, 1402, 1403, 1404, 1405

Execution Path: 1410, 1411, 1413

Execution Path: 1420, 1421, 1422

Execution Path: 1430, 1433, 1434

EXECUTION CONTROL FOR PROCESS TASK

The present application is a continuation of U.S. patent application Ser. No. 08/478,413 filed on Jun. 7, 1995, now abandoned, which is a continuation of U.S. patent application Ser. No. 07/954,970, now U.S. Pat. No. 6,304,891 filed on Sep. 30, 1992.

BACKGROUND OF THE INVENTION

1. Field of the Invention

The present invention relates to processors in computer systems. Specifically, the present invention relates to task management in a processor.

2. Background Information

Modern applications, such as multimedia applications where text, audio, speech, video, and data communications are all processed in real-time, have special requirements. Standard commercially available microcomputers have typically not had the requisite processing power in order to perform all these tasks in a real-time environment. Modern architectures which are designed to handle the load associated with operating these types of tasks in real-time has sometimes dictated the use of a digital signal processor (DSP). However, even when using a digital signal processor, tasks consuming a lot of processing bandwidth still need to be managed in an efficient way in order for all the requisite processing to be done within specific intervals of time.

One approach to task management for processes which need to be completed in a specified interval of time is to divide time into a discrete series of units known as "frames." Frames are intervals of time in which an interrupt or other timing signal is generated to a processor at regular intervals and each of the tasks being executed by the processor is serviced in sequence. In such a frame-based processing system, each of the tasks is typically linked or associated with one another through some data structure, and the data structure is traversed during the servicing of the interrupt at the beginning of the frame, such that each task is serviced within the frame. A frame length is typically chosen based upon available cache memory in the system, and the minimum possible rate at which specific tasks should be serviced, among other considerations. For instance, a MIDI application (one using the Musical Instrument Digital Interface) requires minimum frame duration of 2 to 4 milliseconds. Applications using the V.32 data modem requires a maximum frame limit of 13 milliseconds. At any rate, frame size is typically driven by the application, available hardware, and other factors.

One prior art technique for organizing tasks is to place them in a simple, linear list. In this approach, each task is executed in turn. One shortcoming of this approach is that tasks which are related to one another are not logically grouped. In addition, this prior art approach suffers from the defect that there is no distinction between tasks which require servicing at regular intervals and those which require servicing only occasionally. Therefore, overall execution time of the processor may be hampered (and certain applications hindered, or not able to run at all) by executing both types of tasks without regard for the tasks' timing requirements. In addition, because each of the tasks are linked sequentially, resource allocation may not be done optimally according to a function's activity which comprises one or more tasks. For instance, certain of the tasks linked sequentially may be related and thus unnecessary or inefficient resource allocation for each of the tasks may be performed. This occurs because memory accesses and other types of resource accessing may be done repetitively according to where in the execution list the related tasks appear.

Yet another shortcoming of the prior art organization of tasks is that error conditions which are generated on one task may or may not necessarily abort other dependent tasks. As a result, the application programmer needs to include in each of his tasks error handling routines which will determine whether a previous task on which it is dependent has completed normally. This will prevent the execution of the task because it will not function properly in the absence of the previous task completing normally. This requires extra work for the programmer, plus extra overhead for the processing system. In general, client or process management of tasks is difficult using the prior art sequential method of task servicing and execution.

The prior art sequential task execution list also fails to provide a means for performing certain groups of tasks in different sequences. Certain tasks may be run unnecessarily even where a prior control task has ascertained that only limited number of related tasks need to be executed. Of course, each task will also require execution control code in order to determine whether the task will be run or not. Again, needless overhead is consumed by calling each task for execution, even if not required, due to loading and saving the processor context and retrieving the requested resources from memory or non-volatile storage. This requires that the programmer has a more in-depth knowledge of the underlying operating system and its organization of functions, as well as adds additional complexity to each of the tasks which are linked.

Yet another shortcoming of the prior art approach of sequentially linking tasks in a task list is that the organization provides no means to manage the processing load for a group of tasks which are required to be run in a specific interval of real-time, where different combinations of the tasks are required depending on the status of the function Such a means is important in order to guarantee that each of the functions comprised by one or more tasks is serviced during a frame. This results in difficulty in managing real-time resources, and may cause the failure of a real-time process due to incorrectly determining the required execution load.

SUMMARY AND OBJECTS OF THE INVENTION

One of the objects of the present invention is to provide an efficient means for task organization which groups tasks by function.

Another of the objects of the present invention is to provide a means for organizing tasks such that error conditions and other status information may be maintained easily among groups of tasks.

Another of the objects of the present invention is to provide a means for task flow control such that resources are not needlessly consumed when certain subtasks known as modules are not required to be performed.

Another of the objects of the present invention is to provide a means for facilitating the efficient use of processing power for all types of tasks.

Another of the objects of the present invention is to provide a means for synchronizing the execution of various tasks within specific intervals of time.

These and other objects of the present invention are provided for by a method and apparatus for controlling execution flow within a series of related tasks or modules. A value known as a "SkipCount" is associated with each module which controls which module is executed next in the execution flow. This value is, in a preferred embodiment, an integer which specifies which of subsequent modules should be executed next. For a SkipCount N, the process skips over the next N modules. A negative value, such as a −1, indicates that execution flow terminates at the current module. In this manner, modules which will not be executed are not even loaded into memory for execution, thus conserving processor bandwidth.

These and other objects of the present invention are provided for by a method and apparatus for controlling the activation of a set of tasks on one or more processors. In one embodiment, the tasks are stored in one or more execution task lists, one task list per processor, and the processors are digital signal processors. This method creates a list of tasks to be activated, including the timing relationship for the activation process. The list is then implemented as frame numbers for activation and requested state in the actual task list. Finally, the executing processor compares the requested state to the actual state for each task, and if different, compares the value of the activation frame with the current frame. If the current frame equals or exceeds the activation frame, then the requested active state is transferred to the actual state. This method eliminates any waiting for the client setting the activation process-up, and works well for activation and deactivation of tasks. Furthermore, task activation sequences are supported, allowing multiple processor functions to be created, where the producer task must start to generate data one frame prior to the consumer task starting to receive data.

BRIEF DESCRIPTION OF THE DRAWINGS

The present invention is illustrated by way of example and not limitation of the figures of the accompanying in which like references indicate like elements and in which.

DETAILED DESCRIPTION

This application is related to the following co-pending patent applications filed concurrently herewith:

A patent application entitled INTERTASK BUFFER AND CONNECTIONS, whose inventors are A. Philip Sohn and Eric Anderson, which has been assigned Ser. No. 07/954,902, now U.S. Pat. No. 5,848,295.

A patent application entitled A METHOD AND MEANS FOR PROVIDING MULTIPLE CLIENTS SIMULTANEOUS ACCESS TO A SOUND DATA STREAM, whose inventors are Eric Anderson and Hugh Svendsen, which has been assigned Ser. No. 07/954,873, now U.S. Pat. No. 5,384,890.

A patent application entitled APPARATUS AND METHOD FOR HANDLING FRAME OVERRUNS IN A DIGITAL SIGNAL PROCESSING SYSTEM, whose inventors are Eric Anderson and Hugh Svendsen, which has been assigned Ser. No. 07/954,758, now U.S. Pat. No. 5,388,261.

A patent application entitled APPARATUS AND METHOD FOR ALLOCATING PROCESSING TIME IN A FRAME-BASED COMPUTER SYSTEM, whose inventors are Eric Anderson and A. Philip Sohn, which has been assigned Ser. No. 07/954,338, now U.S. Pat. No. 5,628,013.

A patent application entitled TASK AND MODULE ORGANIZATION FOR PROCESSOR EXECUTION, whose inventors are Eric Anderson and Hugh B. Svendsen, which has been assigned Ser. No. 07/954,988, now U.S. Pat. No. 5,448,735.

A method and apparatus of task management in a processor is described. In the following description, for the purposes of explanation, specific data structures, pointers, resources, times, signals, and formats are set forth in order to provide a thorough understanding of the present invention. It will be apparent, however, to one skilled in the art that the present invention may be practiced without these specific details. In other instances, well-known structures and devices are shown in block diagram form in order to not unnecessarily obscure the present invention.

Overview of a Computer System Used in a Preferred Embodiment

Figure 1:
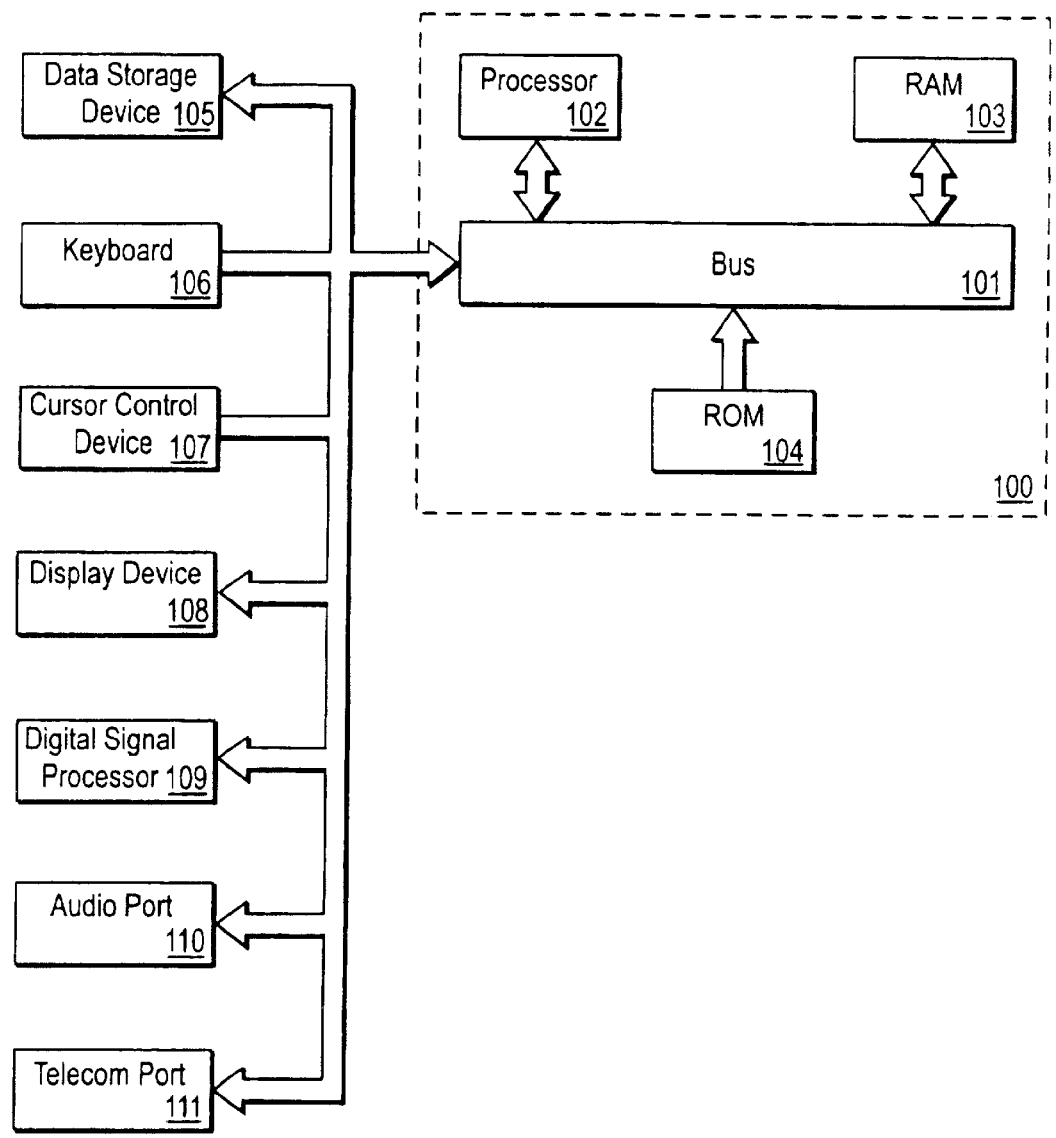
FIG. 1 is a block diagram of the computer system which may be utilized by the preferred embodiment of the present invention.

The preferred embodiment of the present invention may be practiced on computer systems having alternative configurations. FIG. 1 illustrates some of the basic-components of such a computer system, but is not meant to be limiting nor to exclude other components or combinations of components. Computer system 100 illustrated in FIG. 1 comprises a bus or other communication means 101 for communicating information, a processing means 102 (commonly referred to as a host processor) coupled with bus 101 for processing information, a random access memory (RAM) or other storage device 103 (commonly referred to as a main memory) coupled with bus 101 for storing information and instructions for the processor 102, a read only memory (ROM) or other static storage device 104 coupled with the bus 101 for storing static information and instructions for the processor 102.

Other devices coupled to bus 101 include a data storage device 105, such as a magnetic disk and disk drive for storing information and en instructions, an alpha numeric input device 106, including alpha numeric and other keys, for communicating information and command selections to processor 102, a cursor control device 107, such as a mouse, track-ball, cursor control keys, etc., for controlling a cursor and communicating information and command selections to the processor 102, a display device 108 for displaying data input and output, a digital signal processor (DSP) or a other high speed processor 109 for processing DSP resource requests, an audio port 110 for input and output of audio signals and a telecommunications port 111 for input and output of telecommunication signals. In such a computer system configuration, the digital signal processor 109 is considered a coprocessor to the host processor 102.

Architecturally, a DSP is a very fast integer Reduced Instruction Set Computer (RISC) based general purpose microprocessor which includes a pipelined arithmetic processing unit. A fundamental difference from true general purpose processors is that a DSP is designed to perform a multiply and accumulate (MAC) operation very quickly. The MAC operation is heavily used in DSP programs. It should be noted that DSP host applications may be written that do not require DSP coprocessor 109 for execution, but would exploit them if available. An embodiment of the present invention is implemented for use on some of the members of the family of Macintosh® brand computers, available from Apple Computer, Inc. of Cupertino, Calif. (Macintosh® is a registered trademark of Apple Computer, Inc.). A coprocessor 109 that may be utilized is any digital signal processor having operating characteristics and functions similar to those found in DSP 3210 Digital Signal Processor, available from American Telephone and Telegraph (AT&T) Microelectronics of Allentown, Pa.

Operating System Organization

Figure 2:
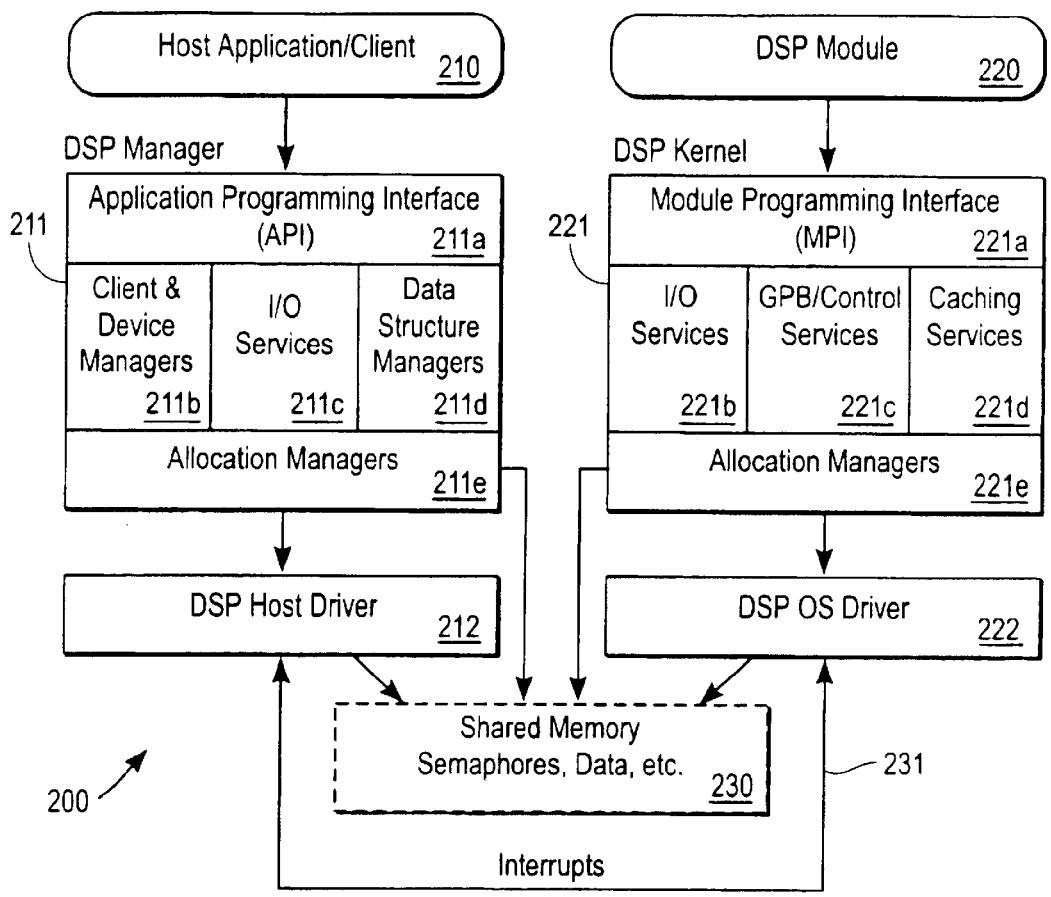
FIG. 2 illustrates the structure of an operating system which is used for managing tasks and clients using a coprocessor, such as a DSP.

The operating system organization of this embodiment is separated into two distinct halves for the two processors operating in the computer system. Referring to FIG. 2, host applications/clients 210 are handled by a DSP Manager 211 which operates in the host processor to direct and spawn tasks which are to be run in the DSP. In contrast, DSP modules or tasks 220 (which are spawned by DSP Manager 211 in the host processor) are operated from within a DSP Kernel 221 which operates within processor 109. In short, there are two distinct levels of computer programs which are used for operation in the preferred embodiment:

(1) Client (application or higher level toolbox) software programs which are executed on the host processor; and (2) DSP programs known as "modules" which run in DSP 109 (FIG. 1).

Therefore, programs may be written for DSP 109 and host 102 separately. For instance, library routines may be generated for operation in DSP 109, and those routines may be available to host-client programmers for reference during execution. Interprocess communication between DSP Manager 211 in host processor 102 and the DSP is provided by the DSP Kernel operating in DSP 109 (FIG. 1) and is provided through shared memory 230. Shared memory space 230 may be coupled to bus 101 or can be part of system RAM 103.

Shared memory 230 contains semaphores, data, messages, and other information which are required for interprocess communication between the two processors 102 and 109. DSP Manager 221 is further coupled to a host driver 212 which provides various hardware implementation dependent functionality for the DSP Manager 211 and other functions which are directed to the DSP Kernel driver 222. Therefore, toolbox routines may be available to the application/client program 210 to direct various actions in the tools residing in the DSP Kernel driver 222. Interprocessor communication is provided through shared memory area 230, as well as by to interrupt lines 231, which are activated when actions need to be taken by either DSP host driver 212 or DSP Kernel driver 222. It should be noted that the structure shown in FIG. 2 is not required for practicing the present invention and is set forth for illustration purposes only. It can be appreciated by one skilled in the art that many other structures of operating systems to provide interprocess communication may be used.

The DSP Manager 211 is available to the host application/client routines 210 through an interface known as the application programming interface (API). In the currently preferred embodiment, DSP Manager 211 performs three primary services which are accessible through the API. These three services are known as the client and device managers 211B, I/O services 211C, and data structure managers 211D. These various services make calls on allocation managers 211E at the lowest levels of the DSP Manager 211. The DSP Kernel 221 is similarly structured to DSP Manager in that it includes a module program interface (MPI) 221A which is accessible by the DSP modules 220 generated by DSP programmers. MPI 221A accesses services available to the DSP modules such as I/O services 221B, guaranteed processing bandwidth (GPB) and control services 221C, and caching services 221D. Underlying these functions is an executive layer 221E which is responsible for managing task sequence and frame handling functions. These kernel routines have access to the DSP Kernel driver 222 and, thus, have access to the shared memory areas 230, and interrupt lines 231. In addition, executive layers 221E also has access to the shared memory area 230 for communication of messages to and from the DSP Manager 211 residing in the host processor.

Data-Structures Used in the Preferred Embodiment

The data structures utilized by the currently preferred embodiment of the present invention are referred to as "modules" and "tasks." A module is a data structure defined by the system and the DSP programmer which is designed to perform a predetermined function. A DSP module always includes program code, but it may also include data, input and output buffers, and parameter blocks. The number of modules and their required resources are defined by the DSP programmer.

A task is a data structure containing a reference to a list of one or more modules. Thus, a DSP task comprises one or more DSP modules. The modules in a task are grouped in the appropriate order and with the appropriate input/output and buffer connections. Frequently, a DSP task contains only one DSP module. A task is activated or deactivated as a single unit. Tasks may be grouped together in order to perform a specific function. The group of sequentially ordered tasks is known as a task list. In essence, a task list is a data structure which references a series of executable modules (i.e., programs). Also, a set of tasks can be sequentially or simultaneously activated or deactivated. A task is installed and removed from the task list as a unit.

DSP modules are provided to an application programmer as a resource and loaded into a DSP task using DSP Manager 211. A task is constructed using a series of calls to DSP Manager 211. These calls create the task structure, load and connect modules in the desired arrangement, allocate the required memory, and install the completed task into a DSP task list. Each of the modules comprises a DSP module header containing pointer information and other information related to the data structure and a series of DSP sections which each point to various resources, including executable code required by the DSP module to perform its function.

Figure 3:
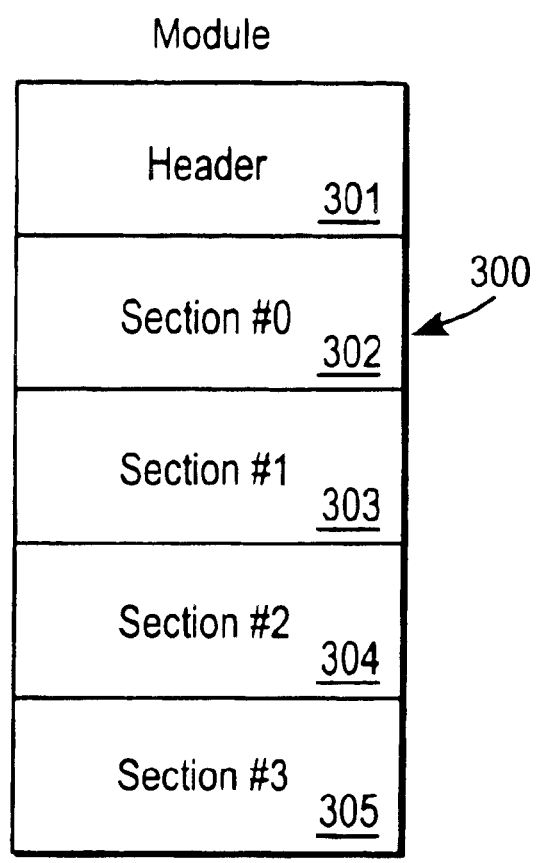
FIG. 3 illustrates the organization of data associated with each module in a task.

The currently preferred embodiment of module 300 is shown in FIG. 3. The internal structure of module 300 includes both code and data. Each module comprises a header and one or more sections. Header 301 contains information about the entire module such as its name, GPB information, and control flags. Header 301 also includes a count of the number of sections in the module. This allows module 300 to be of variable length, and the number of sections to be varied. Finally, header 301 contains the section number which contains the module startup code.

Module 300 shows sections 302–305. Sections allow modules to be created for a wide variety of functionality. In the currently preferred embodiment, each section has a name, pointer, flags, and a data type fields. In addition, each section contains pointers for up to two separate containers. Containers hold the data or code corresponding to the section. The sections can point to code, data tables, variables, buffers, parameters, work space, or any other resource needed to provide the desired function.

Figure 4:
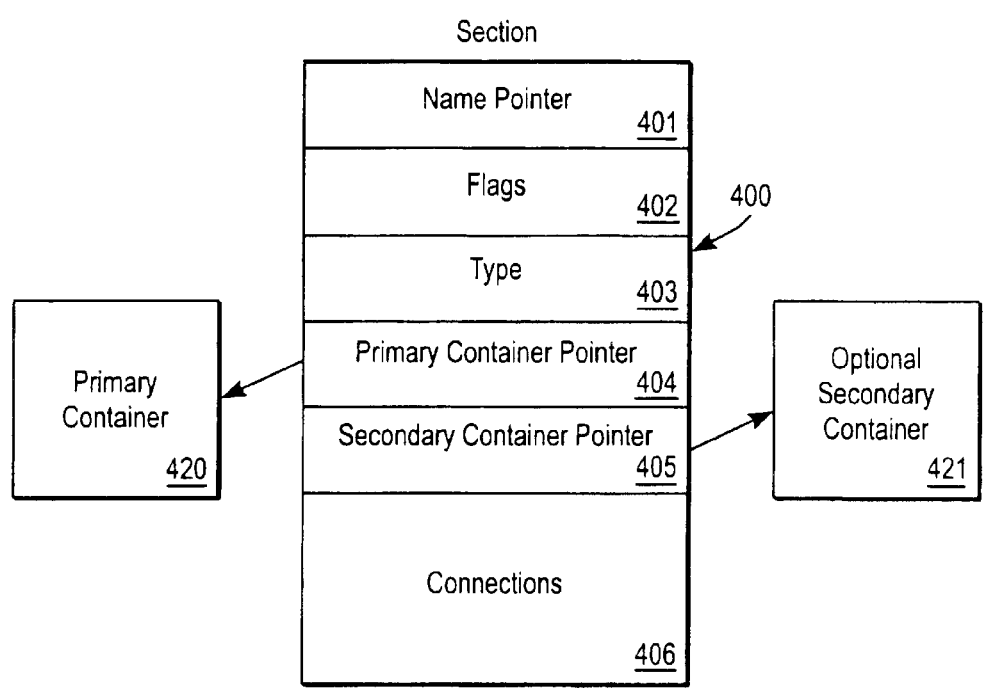
FIG. 4 illustrates the currently preferred embodiment of a section in a module in the present invention.

A section does not contain the actual code or data used by the DSP. Instead, a section is a data structure that contains pointers to the code or data block. The operating system of the DSP uses the section structure and flags to cache the actual code or data block into high speed cache memory during execution of the module. Referring to FIG. 4, section 400 comprises name pointer 401, flags 402, type 403, primary container pointer 404, secondary container pointer 405 and connections 406. Name pointer 401 points to a character string which uniquely identifies the section of a module. Flags 402 and type 403 are used by the preferred embodiment to control caching and manage buffers. Connections 406 is data that is used for buffer management internally to the DSP Manager and is discussed below.

Primary container pointer 404 points to the primary container 420, while secondary container pointer 405 points to the secondary container 421. In the currently preferred embodiment, primary container 420 and secondary container 421 are buffers. The DSP uses these pointers whenever it wants to locate the section data. Every section is normally required to have a primary container pointer 404, which can point to locations either on or off the DSP processor chip 109. The secondary container pointer 405 is optional. If a section has a secondary container pointer 405, then the primary container pointer 404 points to where the DSP user code will access the section and the secondary container pointer 405 points to where DSP operating system keeps the data between executions of the modules. Primary container 420 is allocated in local memory if it contains fixed data or parameters for communication between the host application and the module. Otherwise, primary container 420 is located in high speed cache (on-chip static RAM [SRAM] in the preferred embodiment) to increase execution performance. The secondary container 421 is usually allocated in local memory, but in special cases can be allocated in the cache. Allocated memory for each container must be in either local or cache memory.

To execute modules, each module is cached for access and execution by the DSP. The currently preferred embodiment of the present invention supports two separate execution models: AutoCache and DemandCache. In AutoCache, the programmer specifies which code and data blocks are to be loaded and saved. The DSP Kernel performs all load and save functions automatically. In DemandCache, the programmer explicitly moves code and data blocks on and off-chip, whenever needed, by making the appropriate calls to the DSP Kernel in the module DSP code.

During caching of an AutoCache module, code and data are loaded into the cache according to the section flags prior to its use and then data is saved back from the cache when execution is completed. In regards to primary container 420 and secondary container 421 during caching, the data is moved from secondary container 421 to primary container 420. In the currently preferred embodiment, this usually entails moving the contents from local memory to cache memory prior to module execution. This is commonly known as a cache load. After module execution, the DSP also moves data from the primary container 420 to secondary container 421. In the currently preferred embodiment, this entails moving the contents from cache memory to the local memory. This is commonly known as a cache save. When caching is not required, only one container is needed, the primary container 420. The use of containers provides communications between modules and the host application. This is usually through a shared memory area which either resides in host memory such as 103, or otherwise, is connected to a bus such as 101 shown in FIG. 1. The use of sections as disclosed herein provides unique capabilities wherein multiple modules, either provided off the shelf or written by a DSP programmer, may be modularized in such as way as to be joined together in a multiplicity of combinations. Application programmers may thereby create their own program without addressing the underlying functionality of DSP-specific modules. In addition, a variety of hardware platforms may be implemented with the section model providing compatibility with a variety of hardware platforms and future hardware advances.

Figure 5:
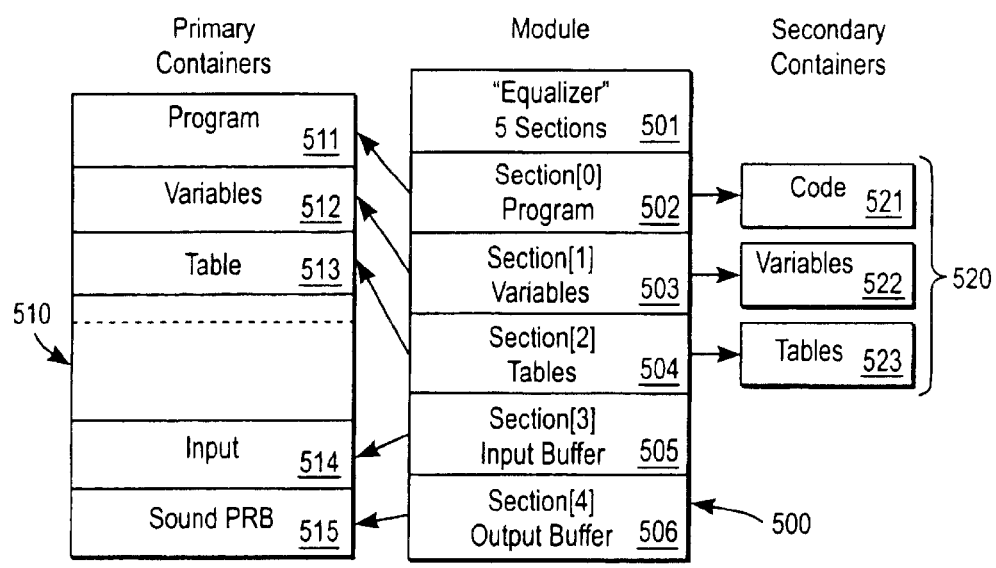
FIG. 5 illustrates an example of various resource references associated with a module of the present invention.

An example module with its primary and secondary containers is shown in FIG. 5. Module 500 is entitled "Equalizer" and contains five sections as indicated in header 501. Module 500 has program, variables and table section pointers 502, 503, and 504 pointing to primary container 510 containing program information 511, variable information 512, and table information 513. In addition, module 500 has an input and output buffer pointed to by 505 and 506 which point to input buffer 514 and sound output buffer 515. A caching function provided by the system in the preferred embodiment moves information between the secondary and primary containers prior to module execution and moves data between the primary and secondary containers after module execution. The secondary container 520 includes code 521, variables 522, and tables 523. Module and secondary containers are located in local RAM, and primary containers are located in the cache. In the example shown, code, variables, and table sections are loaded into the cache prior to executing the code section provided by module 500. After execution completes, only the variables are saved back to local memory.

To execute module 500, memory must be allocated. The allocation and memory management is accomplished in two phases. When the client loads module 500 into memory from a resource file, the DSP Manager allocates all the required blocks in local memory to hold the structure. For module 500, the DSP Manager allocates memory space for the module itself and the three secondary containers 521, 522 and 523. Containers 521, 522 and 523 are then loaded with data from the resource file to complete the first phase.

The client must also specify the I/O connections for module 500. The specifying of 110 connections is discussed below. The connections are made such that any memory allocation eliminates as much buffer movement as possible. If a buffer can be set and left in one place without being moved between execution of modules or tasks, the overhead for maintaining the buffer is also reduced. Besides specifying I/O connections, other modules may be loaded and connected together to form a multi-module task. Once completed, the DSP Manager calls one of the allocation managers to perform the cache allocation. Cache allocation by the allocation managers is the second phase of allocation. Once cache memory has been allocated to the task, it is ready for installation. For DemandCache, additional allocation is performed by the DSP Kernel at run-time.

The Overall Structure of Tasks

Figure 6:
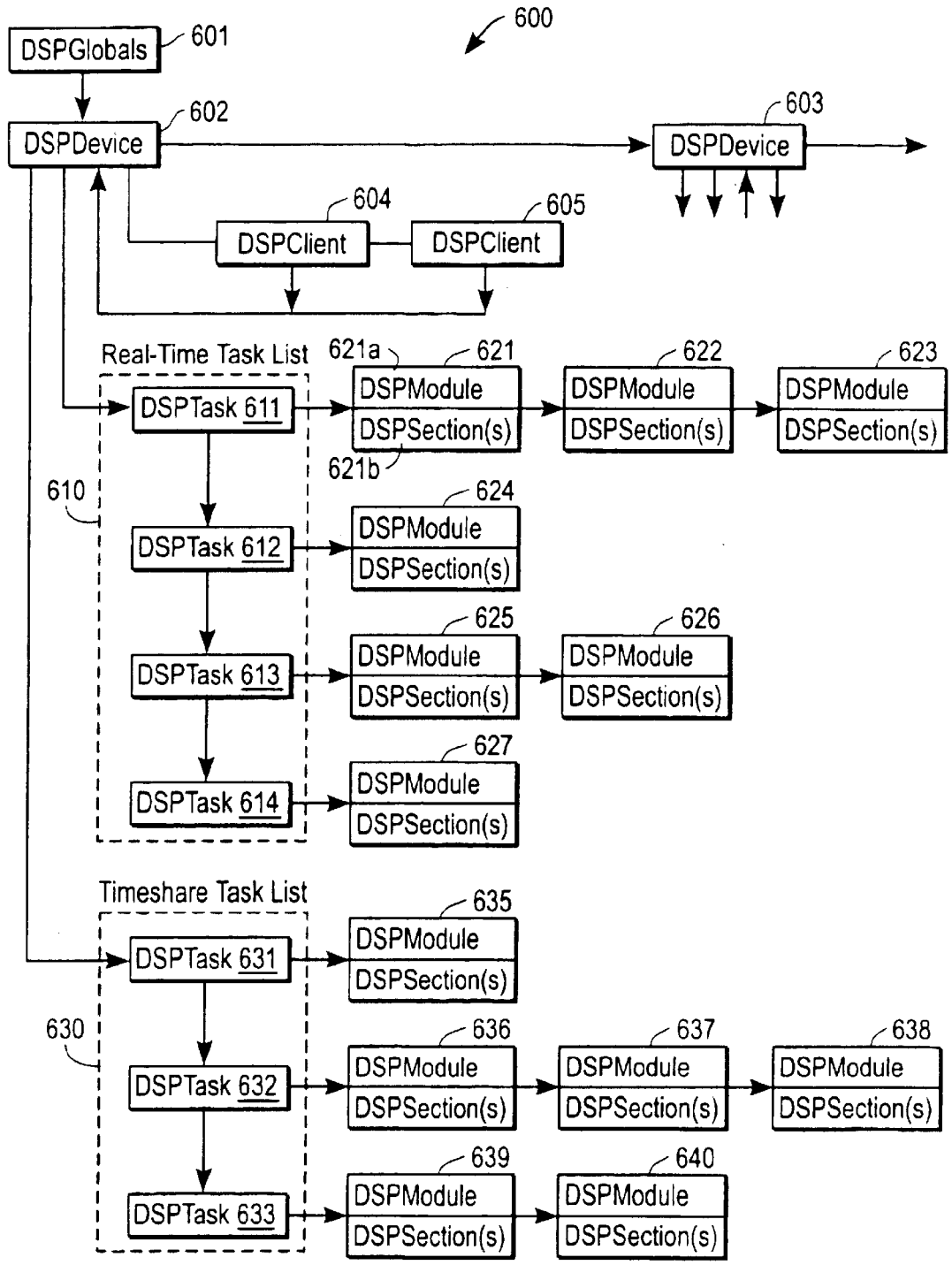
FIG. 6 illustrates the organization of tasks into a task list which may be performed in a DSP.

The overall structure of tasks to be executed in the preferred embodiment is shown with reference to structure 600 of FIG. 6. The system comprises a set of DSP globals 601 which maintains control and information regarding each of the DSP devices, such as 602 and 603, coupled in the system. Each DSP device, such as 602 and 603, may be one as shown as DSP 109 shown in FIG. 1. In this multiprocessing environment, a plurality of DSP devices may be used for certain tasks and/or capabilities in the system. Each of the DSP devices may be coupled to a bus 101 and reside on the main system logic board, or be coupled to the bus as expansion devices in the computer system. The detailed structure of only one DSP device 602 is shown for simplicity, however, DSP device 603 and subsequent devices coupled on a bus such as 101 may have a similar structure.

A DSP device, such as 602, handles a plurality of DSP clients, such as 604 and 605, wherein the client is either a system toolbox or an application that wishes to use a DSP 109. A DSP client is activated by "signing in" the client using a system call made through the DSP Manager 211. Client and device managers 211b are used to manage clients using DSP device 602. In this manner, each DSP device maintains information about the client as it relates to tasks that the client requires.

Each DSP device, such as 602, maintains two independent task lists 610 and 630 which are used for keeping track of tasks currently running in the DSP operating system One task list 610 is known as the "real-time" task list and is a set of routines which need to be operated upon at regular intervals. Each task, such as 611 through 614, in real-time task list 610 is executed only once during regular intervals so that the client requiring the services of each DSP task in task list 610 is serviced within a specific interval of time. A technique known as guaranteed processing bandwidth (GPB) is utilized to ensure that the tasks in real-time task list 610 do not exceed the maximum length of time in which real-time tasks may be executed. GPB is discussed in the co-pending application entitled "Apparatus and Method for Allocating Processing Time in a Frame-based Computer System" which has been assigned Ser. No. 07/954,338, now U.S. Pat. No. 5,628,013 and which is incorporated herein by reference.

Real-time task list 610 links all the real-time tasks 611 through 614 which need to be performed within the DSP in a specified interval of time known as a real-time frame. Each of the "tasks" shown as 611 through 614 is actually a datum in a data structure which references the next task datum in the task list. During each real-time frame, DSP Kernel 24 scans the real-time task list 610 and executes each task 611 through 614 once in sequential order as indicated by the arrows shown in FIG. 6. When the end of the real-time task list is reached, for instance, at DSP task 614, then real-time task execution halts. Each of the DSP tasks 611 through 614 is actually a datum in a data structure which references certain DSP "modules" such as 621, 624, 625, and 627. Modules are related functions or subtasks within each task. Each DSP module datum such as 621a contains a first field 621a which references the executable code for the module. A second field, known as the DSP section(s) fields 621b, is used for referencing all the resources required by the executable module which is referenced by first field 621a.

In addition to real-time task list 610, the DSP device maintains a second task list known as timeshare task list 630. Timeshare task list 630 maintains a similar list of elements in a data structure, such as 631 through 633, each of which references so-called "timeshare" tasks or tasks that do not need to be executed at regular time intervals. Each of the elements 631 through 633 in the timeshare task list references "modules", such as 635, 636, and 639 which all contain references to executable code and resources required by each of the timeshare DSP modules. This is a similar structure to that set forth in the real-time task list described above. The timeshare task list is executed "round robin" whenever the real-time task list is not executing.

The maintenance of a separate real-time task list 610 and a timeshare task list 630 allows the grouping of functions by priority in the operating system of the preferred embodiment. Therefore, a distinction is made about which tasks are time-critical and those that are not. This is an improvement over the prior art single task list method which makes no such distinctions and may burden DSP 110 with more task execution than is actually necessary.

Time Allocated to Real Time and Timeshare Tasks

Figure 7A:
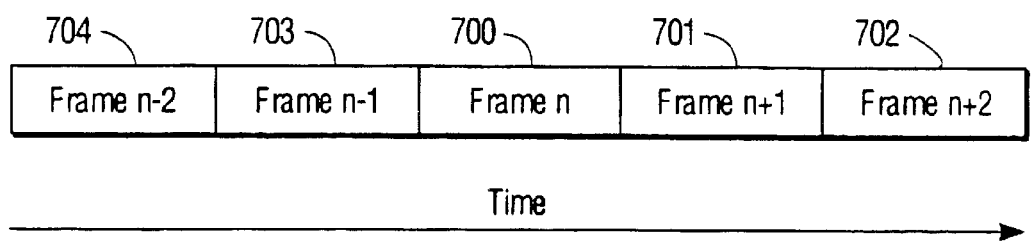
FIG. 7a shows an organization of time into discrete intervals known as frames.

The unique grouping of tasks into real-time tasks listed in the real-time task list 610 and timeshare tasks listed in timeshare task list 630 provides for certain powerful capabilities which allow the DSP processing power to be allocated efficiently and provide for the execution of real-time tasks as quickly as possible. The preferred embodiment uses a "frame-based" approach to handling tasks residing in the two task structures. The frame-based approach to executing tasks is discussed with reference to FIG. 7a. As is shown in FIG. 7a, time is divided into uniform discrete intervals known as frames. A frame N 700 is preceded and followed by frames such as 701 and 703 which are the same length as frame 700. During each frame, the required program code, variables, and input data for each of the real-time tasks in task list 610 are loaded into a high speed cache. The program is executed from the cache, and the resulting output data is dumped from the cache back into external memory. Alternatively, the input data may already be in the cache, from a previous operation, and the output data may be retained in the cache if it is needed for following operations. This method of using a high speed cache is called visible caching.

The frame-based processing used by the preferred embodiment requires some latency in the data flow. An input port of the DSP must collect a full frame's worth of samples before the DSP can process them. Likewise, the DSP must generate a full frame's worth of samples before the output port can start transmitting them. This requires the latency of two frames between input and output data. This is shown with reference to FIG. 7b. For instance, the data which would be processed at frame 750 must be collected during the previous frame 751 while the previous frame's tasks are being processed. Input data N 760 collected during frame 751 will thus be available to frame 750 for processing. Likewise, data generated during frame interval 750 will not be available for output until frame 752, wherein the subsequent frame's data is being processed. Thus, output data N 761 will be available for output at the time that DSP 110 is processing information in frame interval 752.

Figure 7B:
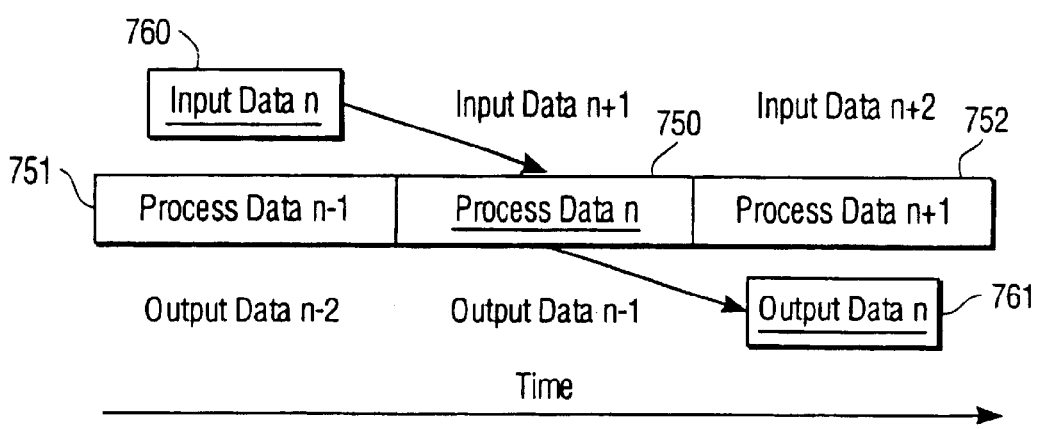
FIG. 7b shows the data processing latency of a frame-based system.

Frames vary in duration depending on the needs of the application program(s) and the available amount of resources. There are basically four factors which influence the selection of time intervals for frames. They are:

1. Size of the buffer is proportional to the frame time interval. The longer the frame, the more cache memory is needed for each buffer.
2. Overhead reduction is inversely proportional to the frame time interval. The shorter the frame, the greater percentage of DSP processing time is used in overhead. For example, if the frame represents 240 samples, the overhead is $\frac{1}{240}$ or 0.42% compared to processing a single sample at a time.
3. Granularity of access. During a frame, the processing sequence cannot easily be interrupted. Changes in process configurations must happen on frame boundaries. The longer the frame, the more granular the access.
4. Input/output latency for various important algorithms. The longer the frame, the higher the latency between input to output data streams. As shown in FIG. 7b, latency is 2 frames from input stream to output stream.

Items 1 and 2 pull in opposite directions. Item 3 is dependent on the application. Sound synthesis with MIDI (Musical Instrument Digital Interface) is one of the most demanding potential applications, putting a lower limit on a frame at approximately 2 to 4 milliseconds per frame. Item 4 sets the upper limit on the frame time. The V.32 data modem has very demanding latency requirements and, has an upper limit of 13 milliseconds per frame.

The preferred embodiment uses a ten millisecond frame time. However, in order to practice the present invention, it would appreciated by one skilled in the art that any length frame has equal application here depending on the circumstances of operation.

Figure 8:
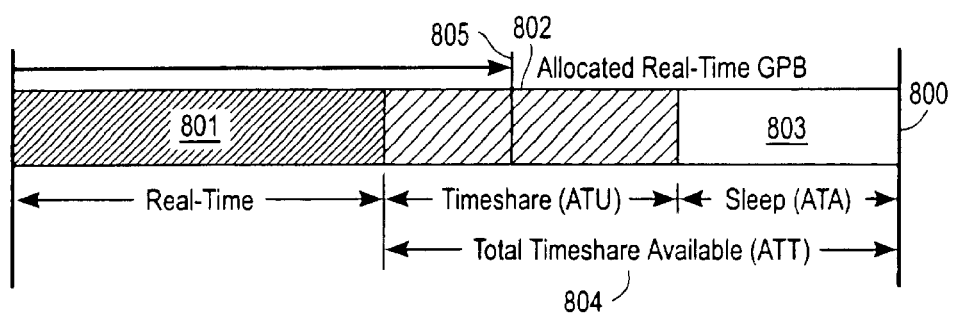
FIG. 8 shows the division of a frame into real-time and timeshare slices.

Generally, each frame is broken up in the manner as described with reference to FIG. 8. A frame 800 which is executed for a given interval of time is comprised of three sections. A real-time execution portion 801, a timeshare execution portion 802, and a sleep portion 803. The real-time portion 801 is the time actually used to process the real-time functions which are currently active in the real-time task list 610 discussed above. Real-time section 801 may be variable in length depending on the number of tasks in the real-time task list 610. However, real-time portion 801 is limited to a maximum time interval within frame 800 as set by the allocated real-time guaranteed processing bandwidth limit shown as time 805 in FIG. 8. This limits the number of tasks and the length of execution of each of the tasks contained in task list 610.

The second portion of frame 802 is used for execution of timeshare tasks in task list 630. Timeshare task processing is performed within the segment of the frame which is a portion of the total timeshare available (ATT) 804. If there are no active timeshare tasks, this segment is skipped. All timeshare tasks are serviced round robin during segment 802 until either the frame ends or all timeshare tasks go inactive. If all of the timeshare tasks contained in list 630 are complete (go inactive) within one frame such as 800, then DSP 110 sleeps for the remainder of the frame at time portion 803 of frame 800. In other words, all processing is suspended and no tasks are performed until the next frame begins, wherein real-time tasks are again performed at a time period such as 801 shown in FIG. 8. Timeshare tasks may not be completed within a time less than the total timeshare available (ATT) in a given frame, in which case they take up the entire time period 804, and no sleep period 803 is present in the frame. Timeshare processing will continue after the real-time segment of the next frame. During period 800, if there are no active timeshare tasks to be performed, the processor actually goes into a sleep mode wherein all processing is halted and, in the preferred embodiment, the processor will shut itself down using a power down instruction. In the preferred embodiment, a DSP such as the AT&T 32010 issues the "power down instruction." The DSP will then be brought back into operation when the next frame interrupt signals the beginning of the next frame. This provides for automatic power savings especially in applications for use on portable computers. In another embodiment, DSP manager 211 in the host processor will even shut down all DSP related circuits contained in 100, including timers, serial ports, and other related hardware to further conserve power, if their function is not required.

The amount of timeshare task time available (ATT) 804 is dependent upon how many real-time tasks are being run in time interval 801. If time interval 801 is very short, then ATT 804 may comprise the entire frame 800.

Determining which processes will be executed during the real-time portion 801 of a frame, and which task will be run in the timeshare portion 802 of a frame, and thus be in one of the task lists 610 or 630, is dependent upon a number of factors. Real-time tasks are those tasks that must be executed every frame. This means that the task must be broken into distinct portions which must be executed in a frame. Real-time tasks are those that must be executed at regular intervals, not necessarily as quickly as possible. Any data stream task connected to a real-time port is such a task—such as a sound processing task, a speech processing task, or a telecommunications task. Any of these types of tasks, if connected to a real-time port such as a speaker, a microphone, or a telephone line, require real-time service. This type of processing is known as isosynchronous processing. Note that the same tasks could be non-real-time if they were used for off-line processing, such as doing sound processing of a disk file.

Tasks running in the timeshare task list 630 will give the maximum available processing time to an application. Real-time tasks may run at a guaranteed frequency, but their overall processing time is limited to the amount allocated. Even if there is unused processing time, real-time tasks are required to stay within their allocated processing time. Timeshare processing is called asynchronous processing.

Some examples of timeshare tasks include lossless compression of disk files, graphics, animation, still image decompression or compression, video decompression, off-line audio processing, and other similar applications that require lots of processing time.

Figure 9:
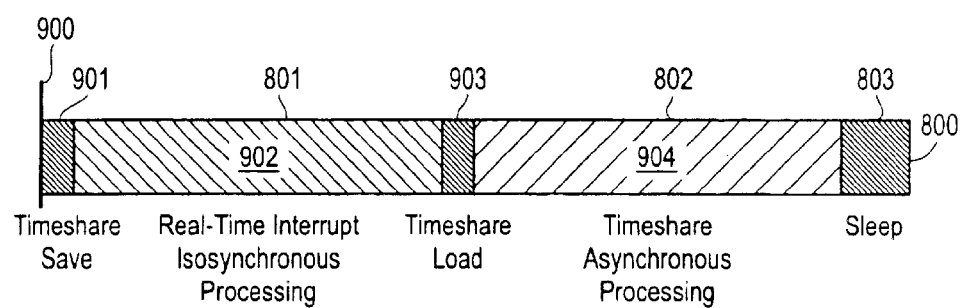
FIG. 9 shows a more detailed representation of the division of a frame into real-time and timeshare slices, with the associated load and store operations required by such tasks.

A more detailed view of a frame such as 800 is shown in FIG. 9. As shown in FIG. 9, at the time of a real-time frame interrupt at time such as 900, a process known as a timeshare context save 901 must be performed prior to real-time task processing, if timeshare was active when the interrupt occurs. If the interrupt occurs during the middle of timeshare task list 630 processing, then the timeshare task context must be saved because processing was halted during an on-going operation. This is performed at time period 901 as shown in FIG. 9. Once the timeshare context is saved as driven by the interrupt at time 900, then real-time interrupt isosynchronous processing may be performed at time period 902. A more detailed view of real-time task processing will be discussed with reference to FIG. 10 below. Then, at the completion of real-time task processing at time period 902, the timeshare task context, if any, which was saved at time period 901 is then restored at time period 903. At time period 904 timeshare task processing of timeshare task list 630 continues until the timeshare task list 630 is empty (all timeshare tasks have completed), all timeshare tasks are inactive, or the frame ends. If timeshare processing ends before the frame ends, as discussed above, the DSP may issue a power down instruction, and go into the sleep mode at time period 803 for the remainder of frame 800. Note that in this example, because the timeshare portion 904 completed prior to the end of the frame, no timeshare context save is required to be performed, as was done at time period 901, because no tasks are remaining in the timeshare task list 630. Therefore, at the beginning of the next-real-time isosynchronous processing period 801 the timeshare process context will not need to be saved.

Figure 10:
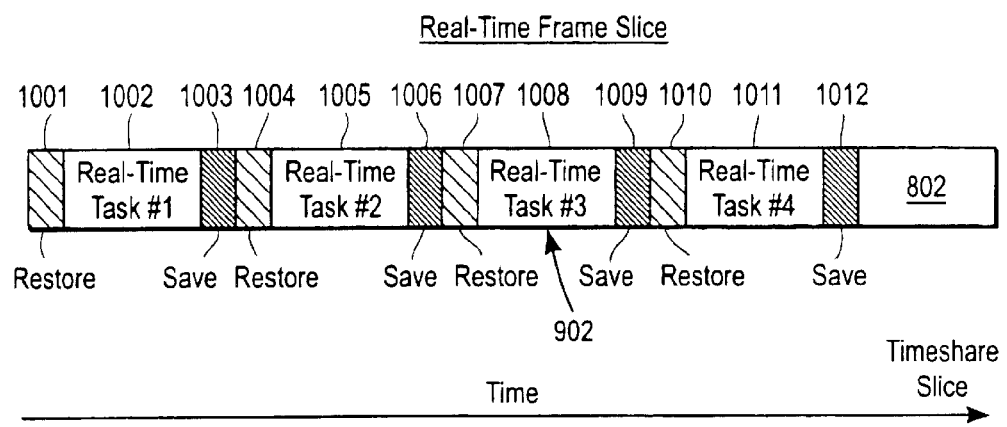
FIG. 10 is a detailed view of a real-time slice of a frame with the associated loading and saving of context during the execution of each real-time process.

A more detailed view of the real-time frame slice 902 where real-time task processing takes place is shown in FIG. 10. Real-time task list 610 is processed in turn by executing each real-time task in the list such as 1002, 1005, 1008, and 1011 shown in FIG. 10. Of course, each real-time task context needs to be saved at the completion of execution and restored prior to execution. For instance, real-time task #1 1002 requires that its context be restored at time period 1001 and saved at time period 1003. Similarly, real-time task #2 1005 requires to be restored at time period 1004 and saved at time period 1006. This save/restore process is called visible caching, and may be reduced in time if one task utilizes the output of a previous task, where the data remains in the cache. In this case, the data does not need to be saved and restored, which allows one real-time task to access information from the previous task efficiently, thus increasing the number of tasks that can run in real-time frame slice 902. Finally, the last real-time task which is executed at time period 1011 is saved at time period 1012, and the timeshare slice 802 is then executed in the manner as discussed above. FIG. 10 is shown in a simplified form, assuming that each real-time task is a single operation. However, as will be discussed below, a task is actually comprised of several modules, and each module within the real-time task will be executed within the task such as in a time period 1002 or 1005.

Figure 11:
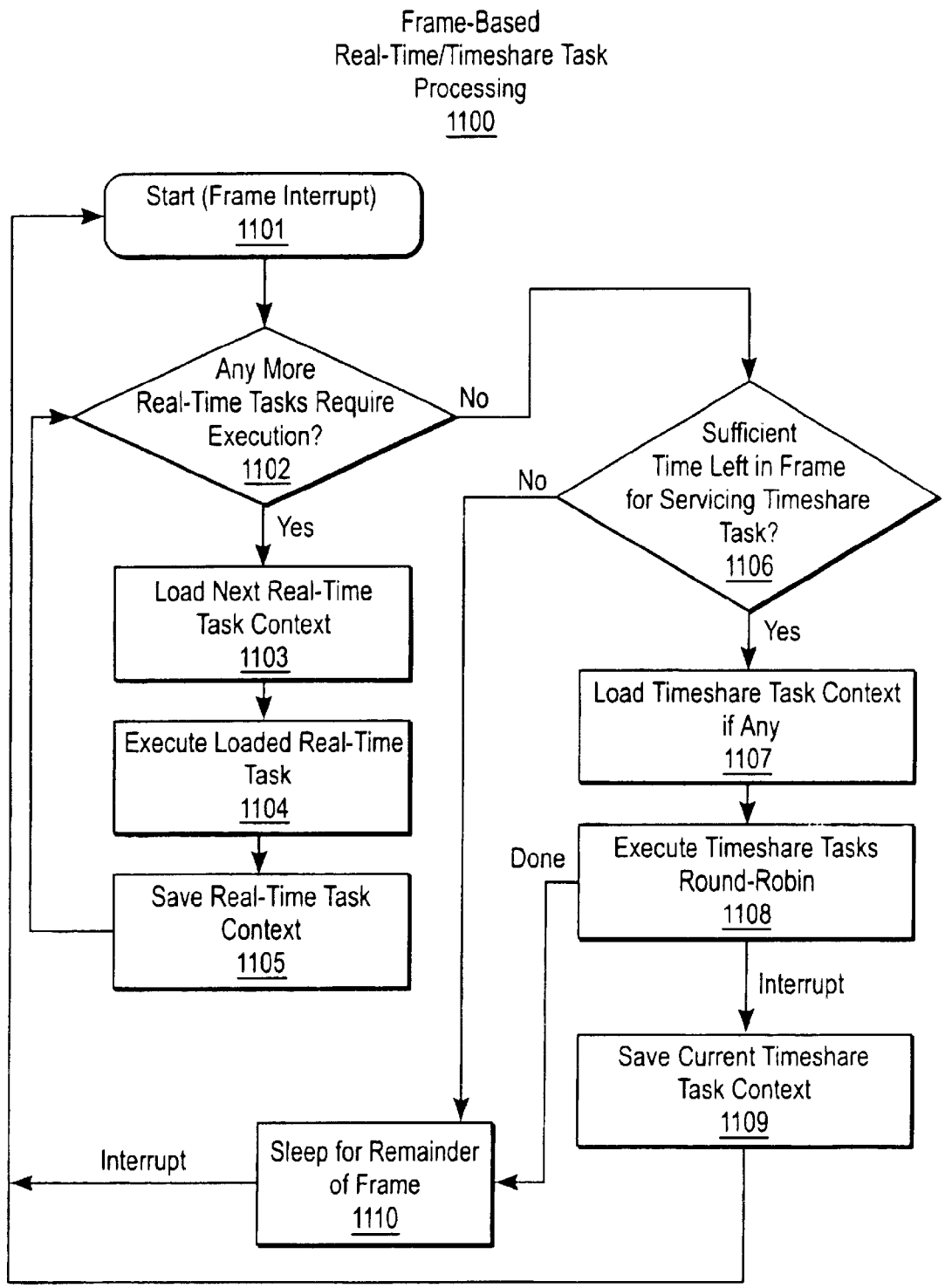
FIG. 11 is a flow chart showing the process used for servicing real-time and timeshare tasks.

In summary, the process used in the preferred embodiment to perform real-time and timeshare task processing is shown with reference to FIG. 11. Process 1100 commences at step 1101, and it is determined whether any more real-time tasks require execution at step 1102. This may be done by determining that the pointer to the next task is nil for task list 610. If there re more real-time tasks to be serviced, then step 1102 proceeds to step 1103 herein the next real-time task context is loaded. The next real-time task is then executed at step 1104, and its context is saved at step 1105. Then steps 1102 through 1105 may be again performed if there are any more real-time tasks left in real-time task list 610. Once all real-time tasks have been serviced as determined in step 1102, 1102 branches to step 1106 which ascertains whether there is time left in the frame for servicing timeshare tasks. In other words, a minimum period of time must be left in the frame in order for timeshare tasks to be performed. In particular, there should be enough time to restore context, do some processing, and then save context at the beginning of the next frame (since all three functions—load context, process, save context—are required each frame, there should be enough time remaining in the frame after real-time is done for all three operations before activating timeshare). It would be useless to restore the context if the context cannot be used to complete any processing. In the preferred embodiment, the time required for restoring and saving timeshare is determined during the boot process, and made available to the DSP Kernel so that the decision in step 1106 can be made. If there is insufficient time to restore and execute timeshare, a branch is taken to step 1110, and the DSP waits until the next frame to continue real-time processing.

If, however, it is determined at step 1106 that there is sufficient time left in the frame for servicing timeshare tasks in task list 630, then the timeshare task context saved prior to the last interrupt is loaded at step 1107. If there was no previous context, no context is loaded. However, processing continues to step 1108 in any case. This occurs in the case where a timeshare task has just been activated following a period of not executing timeshare tasks. Then, each of the timeshare tasks may be executed in turn at step 1108 by loading their respective context and executing the task at step 1108. This continues until one of two events happens:

1) The next frame interrupt occurs; or
2) There are no active timeshare tasks in task list 630.

If an interrupt occurs first, then the timeshare task context is saved at step 1109, and process 1100 returns to step 1101 for real-time task execution. If, however, there are no more timeshare tasks to execute, then process 1100 proceeds to idle or sleep at step 1110 wherein a power down instruction is issued in one embodiment of the present invention, or a delay loop is executed in another embodiment of the present invention, and DSP 110 waits for the remainder of the frame to transpire. Finally, the next frame interrupt occurs and the process returns to step 101. In this manner, real-time and timeshare tasks may be managed according to their requirements, and processor bandwidth may be used efficiently.

Before a task is installed in the timeshare task list, it should first be determined whether that task can properly be serviced on a timeshare basis, due to the fact that the total timeshare available varies dynamically. The DSP Kernel knows how much processing time is available per frame, since it is computing the processing bandwidth for all of the real-time tasks. The total remaining (unused) real-time available for use by timeshare tasks may be computed as follows: for each frame, recompute the average time remaining after all real-time tasks have completed. A form of moving average calculation is utilized, such as:

average timeshare=previous average value·0.9+current frame value·0.1.

This gives each new frame's remaining time a 10% weight, against a weight of 90% on the previous average. Alternate averaging techniques can be used. Also, it is possible for the DSP Manager to do this calculation by sampling the value every N frames. While this may not be as accurate, it simplifies the Kernel.

In addition to the average available timeshare processing, the frequency of the timeshare task list execution is required. If there are many tasks in the timeshare task list, execution frequency for each task will be low. A measure of this can be computed by calculating a moving average of the number of frames required to completely process the timeshare list once. This must be done each time through the timeshare task list. The calculation could be done as follows:

> frames used=ending frame number−starting frame number
>
> average frames used=previous average frames used·0.9+current frames used·0.1

Note that it is possible to have a "frames used" value of zero for cases where few timeshare tasks are active or installed, or where most of the processing time is available for timeshare. This will result in an average frames used value of less than 1.0. Other averaging methods may be used. The average frames used value could alternately be computed by the DSP Manager by sampling the real-time and timeshare frame numbers on a regular basis. This will be less accurate, but reduces the Kernel complexity.

By using the average frames used and the average available timeshare processing per frame, the frequency in which a new timeshare task will be executed can be computed as follows:

> current timeshare load=average timeshare·average frames used
>
> proposed timeshare load=current timeshare load+GPB estimate of task
>
> computed frames used=proposed timeshare load/average timeshare (the GPB estimate of the task is described in the co-pending application entitled "Apparatus and Method for Allocating Processing Time in a Frame-based Computer System" which has been assigned Ser. No. 07/954,338 and is attached hereto as Appendix: A), now U.S. Pat. No. 5,628,013, and which is incorporated herein by reference.

If the calculated "proposed" frames used is too high (infrequent execution) for the desired function, the task should not be installed in the timeshare list. Note that a timeshare client must monitor the processing rate of its timeshare tasks because change in the real-time load or in the timeshare task list affects the amount of processing its timeshare task receives. This process can be assisted by notifying a timeshare client whenever a new real-time task is added to the task list. Another technique for monitoring timeshare processing rate is for the client to request the timeshare frame number from the DSP Manager. The number will be incremented once for each pass through the timeshare task list. Another aid to timeshare management is to provide the unallocated processing value per frame in addition to the average timeshare value described above. Since GPB can be allocated and not used, the unallocated processing is typically smaller than the typical average actually available processing. This number is used to give a "worst case" computed frame rate as follows:

> current timeshare load=average timeshare·average timeshare frames used
>
> proposed timeshare load=current timeshare load+GPB estimate of task
>
> computed worst case frame rate=proposed timeshare load/unallocated GPB The computation gives the frame rate of timeshare execution, assuming all real-time tasks are using their allotted processing.

Dividing Tasks into Modules

Returning to FIG. 6, it should be noted that each of the tasks residing in either the real-time task list 610 or the timeshare task list 630 are actually a series of data structures containing references to "modules" in the architecture of the preferred embodiment. A DSP "task" such as 611 is actually a datum in a data structure known as task list 610 which references a series of executable programs known as "modules." For instance, one task such as 611 may refer to modules 621, 622, and 623. Each of the tasks 611 through 614 and 631 through 633 are actually elements in a data structure which refers to these modules. Each of the modules such as 621 through 623 is a series of data structures within itself. The modules are all related functions within the task having predetermined functions. In this manner, having this dual level task structure, related modules may be associated with r=one another under one "task" heading.

A task such as 611 in the preferred embodiment is made up of DSP modules such as 621, 622, and 623 and DSP tasks such as 611. Each of the DSP modules and DSP tasks are data structures, and are distinguished as follows:

DSP Module—A DSP module is the basic building block of DSP functionality. It always includes DSP code, but it may also include data, input and output buffers, and parameter blocks. The number of modules and the resources they require are definable by the DSP programmer.

DSP Task—A DSP task is made up of one or more DSP modules. This grouping places together, in the appropriate order and with the appropriate input/output and buffer connections, all the basic module functions needed to complete a particular job. A DSP task will frequently contain only one DSP module.

DSP modules such as 621, 622, and 623 are provided to an application programmer as a resource and loaded into a DSP task such as 611 using DSP Manager 211. A task is constructed using a series of calls to DSP Manager 211. These calls create the task structure, load and connect modules in the desired arrangement, allocate the required memory, and install the completed task into a DSP task list such as 610 or 630. Modules may be either programmed by the application programmer or may be obtained as off-the-shelf library routines called by the application program which provide certain specific functionality and achieve a result desired by the application programmer.

Each of the modules such as 621 comprises a DSP module 621a, which contains pointer information and other information related to the data structure, and a series of DSP sections 621b which each point to various resources and executable code required by the DSP module. This will be described in more detail with reference to FIGS. 10 through 12. A more detailed view of one task and its module organization is shown with =reference to FIG. 9.

Figure 12:
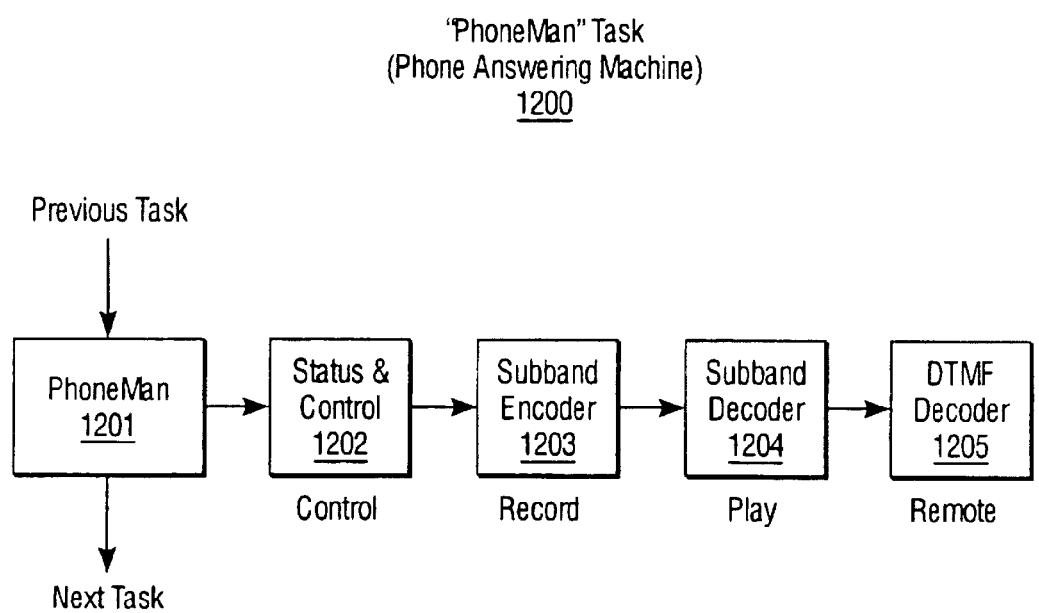
FIG. 12 shows the organization of one example task which has a series of modules linked and associated with one another.

1200 in FIG. 12 shows the task datum 1201 and its associated module data 1202 through 1206 which comprise a single task entitled "PhoneMan." PhoneMan 1200 is a phone answering machine task implemented within DSP 110 of the preferred embodiment. In this embodiment, the task datum 1201 is shown as having certain basic information about the task, for instance, the name "PhoneMan" and is referenced from the previous task in the task list, and contains a reference to the next task in the task list. Note that the PhoneMan task 1200 may be either a real-time task or a timeshare task depending on the application. Also, task datum 1201 contains a reference to a status module 1202 of PhoneMan which performs various control functions within the task. For instance, in one embodiment, the control or status module 1202 may control execution flow within the remaining modules 1203 through 1205. It should be noted again that 1202 through 1205 are merely data structure elements which may be either linked using pointers, or referenced in some other manner well-known to those skilled in the art. The actual executable routine required by such modules will be referred to in fields contained with each of the data structure elements 1202 through 1205. As mentioned previously, modules 1202–1205 may be off-the-shelf, commercially available modules to the application programmer, or the application programmer himself may code modules 1202–1205.

In the example shown in FIG. 12, in addition to the status module 1202 which controls overall execution of task 1200, is Subband Encoder module 1203. Subband Encoder 1203 is used to record messages from the incoming caller. The Subband Encoder module 1203 will reference a Subband Decoder module 1204, which is used to play greeting or other messages to the caller. Subband Decoder module 1204 references DTMF (Dual Tone Multiple Frequency) Decoder 1205. DTMF Decoder 1205 is used for detecting incoming touch tone control signals issued by an incoming caller. The results of this module are made available for the Status & Control module 1202 on the next frame through shared memory, and thus can be used to modify the operation of the answering machine program. Note that in this example, the Subband Encoder, Subband Decoder, and DTMF Decoder modules are likely to be available off-the-shelf, while the Status & Control module typically would be written to support a particular application.

The unique structuring of a task into "modules" as is set forth above provides for certain powerful functions. This is a distinct improvement over the linear manipulation of a task list which provides no logical connection between tasks in the task list. So, the primary advantage of the grouping of functions into tasks and modules, as is set forth and discussed with reference to FIGS. 6 and 12, is to group functions by modules under a general heading known as a "task" in order to synchronize these functions very efficiently. Yet another advantage of using the dual level task structure is to handle error conditions. So for instance, if one module such as the status module 1202 or the Subband Encoder 1203 incurs an error condition, then the subsequent modules which may be executed such as 1204 or 1205 may be aborted or flagged to not load and execute, and a message passed back to the DSP Manager in the host processor that the task aborted. Thereby, the entire task datum 1201 may be flagged in some way that the task has an error condition, and thus the task may be either reinitialized, aborted, or removed from the task list. Many error handling conditions are contemplated within the spirit and scope of the present invention.

Yet another advantage of the grouping of tasks to modules under one task heading is to manage the bandwidth of the processor in an efficient manner. In this way, the worst case execution duration (known as "guaranteed processing bandwidth" or GPB) of the modules for a task such as 1200 may be maintained in a datum such as the task data structure element 1201. By using this worst case timing, the execution of the real-time and timeshare portions of the frame may be managed efficiently within the bandwidth provided by the processor.

In general, the overall advantage of having a structure similar to that shown in FIGS. 6 and 12 is to allow efficient client management of tasks by modules. So, error conditions, insufficient time in a frame, execution flow (see below), resource allocation (such as memory), and any other operating conditions which makes referring to the tasks by modules convenient are made substantially easier to the application programmer. Because tasks can be referred to in a task list, and those tasks by the modules they reference, process management in the DSP is much more efficient. Further, development of application programs is simplified by allowing the development of DSP specific modules which can be used to form application programs.

In summary, the modular architecture of the preferred embodiment provides a number of advantages over the prior art. It can be appreciated by one skilled in the art that the application and utility of the present task structure between the dual-threaded task lists shown as 610 and 630 in FIG. 6, and the dual-level module structure shown in FIGS. 6 and 12 has utility far exceeding that disclosed herein.

Controlling Module Execution Flow

Another advantage provided by structuring of tasks into modules, as discussed with reference to FIG. 12 above, is that the control of execution flow within tasks may be accomplished by placing references in each module to subsequent modules. This is done in the preferred embodiment by making calls to routines in the DSP Manager. In this manner, instead of the use of programming constructs within application programs in order to control execution flow between modules in a task, a facility is provided in order to update and prevent modules from even being loaded into memory, and thus conserving resources and the bandwidth of the processor. This is done using a technique known as skip processing.

Figure 13:
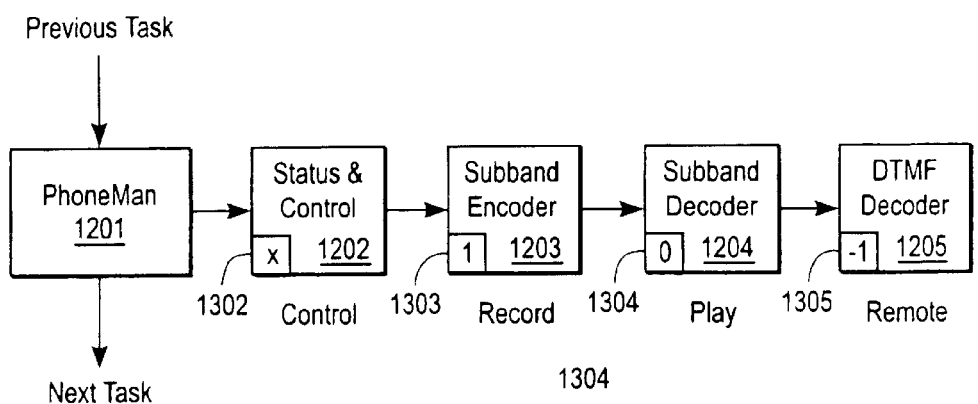
FIG. 13 shows a method used by the preferred embodiment to control the execution flow of modules of a given task.

Skip processing is described with reference to FIG. 13. As is shown in FIG. 13, task 1201, as was discussed above, is shown, however, each module now has associated with it a field such as 1302 of module 1202 which is entitled a "SkipCount." A SkipCount such as field 1302 indicates which is the next module to be executed. In the example shown in FIG. 13, status module 1202 contains a SkipCount field 1302. SkipCount 1302 may contain an integer value indicating which is the next module to be executed. This allows execution of the modules to flow properly and be controlled within the application or DSP program. The value contained in SkipCount field 1302 may contain a value as follows which specifies which module is executed next:

| SkipCount | Action |
| --- | --- |
| −1 | Endtask. |
| 0 | Execute next module. |
| 1 | Skip next module (and execute following module). |
| 2 | Skip next two modules. |
| N | Skip next N modules (proceed to N + 1th module after current module). |

Referring to the example shown in FIG. 13, 1302 contains an x (undefined), indicating that this SkipCount value is set by the Status & Control module 1202. SkipCounts such as 1302 within a module may only be modified by the module, or by the host. In this instance, SkipCount 1302 is modified by the module that owns it, 1202. If the phone is on-hook and is not ringing, this value is set to −1 by a call to the DSP Kernel, and none of the other modules in PhoneMan are executed. This frees up the maximum processing for time-share tasks.

Once the phone rings the appropriate number of times, counted by module 1202, it is taken off-hook, also by module 1202. A few frames later, it is appropriate for a greeting message to be played. The Control & Status module 1202 sets its SkipCount field 1302 from −1 to 1, and thus the Subband Decoder module 1204 and DTMF Decoder module 1205 is activated by skipping the next module 1203. Subband Decoder 1204 plays the message, which usually will last for numerous frames, and DTMF Decoder module 1205 will scan the incoming data to see if the caller is issuing commands to the application via the Touch Tone keys on his phone. If so, these values are placed in a shared memory location for processing by either the application or by Status & Control module 1202. In this way, a caller my interrupt the greeting, and access other functions of the answering machine. These other functions could be handled by the host application, or by additional modules in the task.

Once the greeting has completed and a "beep" is played (part of the greeting, or generated by yet another module), Status & Control module 1202 resets its SkipCount 1302 to 0, causing the Subband Encoder module 1203 to become active (in other words, skipping to the next module 1203). Since SkipCount 1303 of the Subband Encoder module 1203 is a 1, execution proceeds to DTMF Decoder 1205, and skips the next module, Subband Decoder 1204. This selection allows any incoming message to be recorded, and still maintain the DTMF Decoder function for continued remote access control by the caller. Once Status & Control module 1202 determines that the call is complete, it sets its Skip-Count 1302 back to −1, and processing remains in the single control module 1202 until a next call is received.

As can be appreciated by those skilled in the art, there are many configurations possible for a multiple module task, depending on the function desired and the function modules available. In the example of PhoneMan task 1200, all of the modules can be standard functions with the exception of the Status & Control module 1202, which must be written specifically for the answering machine application. However, the Subband coders and DTMF decoder 1203–1205 modules do not have to be specific to the telephone application, but can be used in other configurations and applications and may be commercially available as off-the-shelf components. Normally, the SkipCount of these modules is initialized to 0 when loaded, and must be set to the desired values for the specific application by the application program prior to setting the task active. Note again that in the preferred embodiment, modules may modify their own SkipCount fields only, but the host processor may also change the SkipCount in such a module at any time. This allows a control module such as 1202 to perform such actions through the host.

Figure 14A:
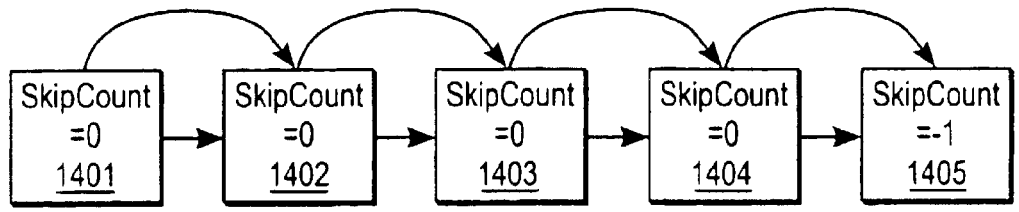
FIGS. 14a through 14d show various examples of using the method of task flow execution described in FIG. 13 above.
Figure 14B:
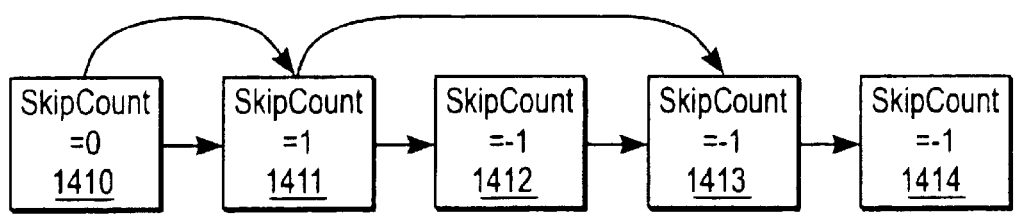

A set of examples using the SkipCount field are shown in FIGS. 14a through 14d. For instance, as shown in FIG. 14a, all of the modules 1401 through 1405 are executed sequentially in turn because each of the SkipCounts contained in the modules are 0, except for 1405 which contains a SkipCount of −1 indicating that it is the last module in the execution list. Note that it does not matter what the SkipCount value is for the last module, since in any case execution of the task terminates there. FIG. 14b shows an example wherein modules 1410, 1411, and 1413 are executed in turn. The SkipCount in 1410 contains a 0, thus indicating that it should skip to the next module 1411. The SkipCount in 1411 contains a 1 indicating that it should skip the next module 1412, and thus proceed to execute module 1413. The SkipCount of module 1412 is ignored. Module 1413 contains a SkipCount field of −1 indicating that it is the last module to be executed.

Figure 14C:
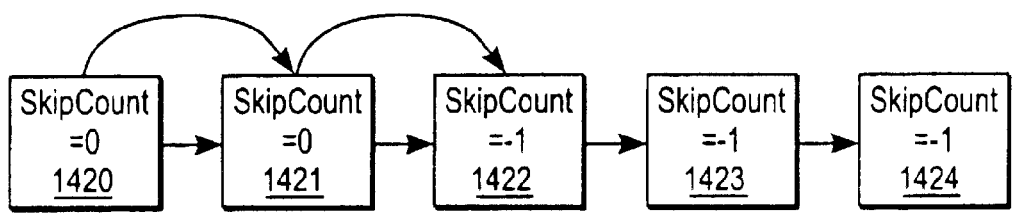
Figure 14D:
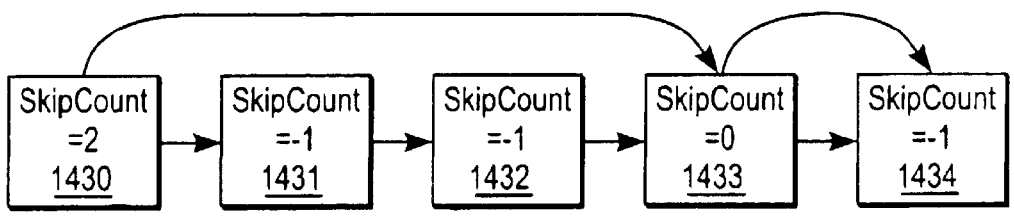

Yet another example of an execution flow is shown in FIG. 14c. The execution path in FIG. 14c executes 1420, 1421, and then 1422, in turn. 1420's SkipCount field contains a 0 as does module 1421. So, each of those modules is executed in sequence, passing control to module 1422. 1422's SkipCount field is equal to a −1, thus indicating that it is the last module in the execution path shown: in FIG. 14c. Finally, the execution of the modules shown in FIG. 14d flows from module 1430 to module 1433. Module 1430 contains a SkipCount equal to 2 indicating that the execution should skip modules 1431 and 1432. Modules 1431 and 1432 are skipped and not executed, and execution proceeds to module 1433. Their SkipCounts are ignored. 1433 contains a SkipCount equal to 0, thus indicating execution should proceed to module 1434, and module 1434's SkipCount contains a −1 indicating that it is the last module in the execution flow.

Thus, it can be appreciated by one skilled in the art that control flow of modules arranged in the fashion discussed with reference to FIGS. 13 and 14a–14d prevents the unnecessary loading of executable modules. Thus the unnecessary consumption of resources due to a program's loading and saving (even if not functionally required) is avoided by using a SkipCount field as discussed above. It can be appreciated by one skilled in the art that the use of a SkipCount and thus the external control of execution flow outside executable modules has utility exceeding that disclosed herein. It should also be appreciated by one skilled in the art that the particular value and association of the SkipCount as a field within the module datum is not required for practicing the present invention. For example, a Skip-Count may, in an alternative embodiment, represent the next module to be performed wherein a positive integer value N would indicate which next Nth module to skip to, a negative value might be used to return to an earlier executed module in the task (e.g., −1 means return to the previous module) and a zero means to end the task. It can be appreciated that many departures within the scope of the invention disclosed herein may be made by one of ordinary skill in the art.

Synchronizing Task Execution

Another feature provided by the preferred embodiment's unique structuring of tasks in a task list, such as real-time task list 610 and timeshare task list 630, is the use of a series of flags to control task execution within a specified interval of time. Simultaneous task activation and deactivation is provided for real-time tasks in the preferred embodiment because certain of these tasks may be required to be run within a particular time interval of one another. This is required in two cases:

1) A task or series of tasks must be started in sequence at a particular frame separation on the same processor,
2) A task or series of tasks must be started in sequence at a particular frame separation on different processors.

The first case may occur if the first task (data producer) does not generate frame-synchronous data (i.e., a frames worth of data every frame), and is connected to a task (data consumer) which requires data every frame. An example of this is a decoder which works on frames longer than the current frame rate, and therefore must break up the decoding of its data over several frames, and only has data output when it is complete. An example is the MPEG II audio decoder, which uses frames longer than the standard frame rate provided in the system of the preferred embodiment. This makes the data output of such tasks "bursty" rather than frame synchronous, and thus it must be fed into a FIFO, and the data consumer must be started some fixed number of frames later. The host cannot be responsive enough to be able to ensure that the starting sequence is correct or in time without a real-time mechanism.

The second case is easier to see. When a series of frame-synchronous tasks are passing data between them on a single processor, data synchronization is automatic. All tasks should be started at the same time, and the data flow and synchronization is determined by the ordering of the tasks and modules. However, if the same tasks are placed on several different frame-synchronous processors, there is no guarantee of their time relationship within any given frame. In fact, the data must be transferred via a buffer such as a FIFO, and the producer task must be started one frame ahead of the consumer task, to ensure that there is a supply of data every frame for the consumer. In the preferred embodiment, a simplified version of the FIFO is used for this purpose. This simplified FIFO is called a HIHO, and only holds two frames of data. It can be clearly understood by anyone familiar with the art that this case—a two frame buffer and a one frame starting offset—is the minimum latency case for such a system.

Thus, what is required is a mechanism that allows a host application programmer to set up the activation of a set of tasks, which may be on one or several different DSP's, where they can be activated in proper sequence and relative frame position. While it is possible to do this with two separate mechanisms—one for a single processor, and a separate mechanisms for multiple processors, it is more efficient to do it with a single mechanism.

The method in the preferred embodiment for accomplishing this start-up synchronization is also used for deactivating tasks. The function is identical. The function consists of two DSP Manager calls and a routine in the DSP Kernel's Executive routine.

Figure 15:
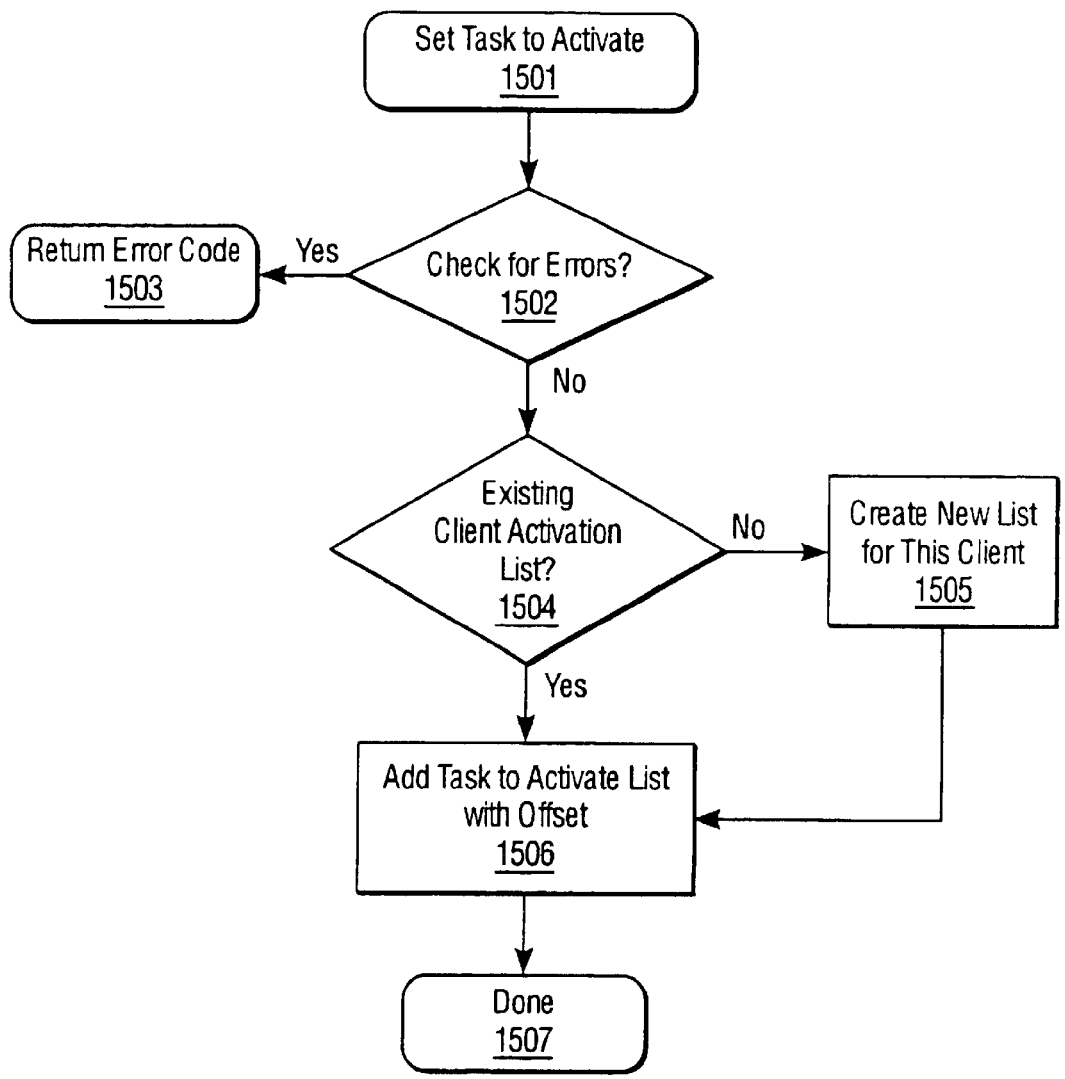
FIG. 15 shows a flow chart of the method used for setting up a sequenced and precise frame related task activations.

The client starts by telling the system which tasks it wishes to activate (or deactivate or any combination thereof) by making a series of "Set Task to Activate" calls. This call, shown in FIG. 15, sets up a data structure which contains the information necessary to quickly do the proper operations on the task list when it is time to do so. The client provides the task name or a task reference number, and the relative activation frame. For example, the relative activation frame value of 0 (zero) means that that task will start first. A value of 1 means that that task will start one frame after any task with a value of 0. A value of 2 means a two frame delayed activation, etc. This may be useful for the producer/consumer relationship discussed above.

The DSP Manager sets up a data structure with the required information. In one embodiment, the data structure is an array. The data required is a means for rapidly accessing the task structure (a task pointer, for example), and the frame activation offset value discussed above. For multiple DSP systems, a DSP reference is also required to allow error checking. The process starts in step 1501, the entry point. Step 1502 checks for errors. In one embodiment, errors include conditions where the task is still in the process of responding to a previous activation/deactivation command. For a multiple processor system, an error may occur if one of the specified DSP's is not frame synchronous to previously specified DSP's in the current activation list. Another error is an attempt to synchronize tasks that are on both the timeshare and real-time task lists 610 and 630, or to try to synchronize tasks on two different timeshare task lists. Neither of these operations make any sense, due to the nature of the timeshare task list. If an error occurs, an error code is returned to the client, step 1503.

Assuming no errors, the process proceeds to step 1504, where it is determined if a activation list has already been started for this client. Note that there are various ways to implement this function, but the method described here is the preferred embodiment. If no such list exists for this client, then a new list is started, step 1505. The task is added to the activation list in step 1506. The list includes all of the necessary data to accomplish the activation. Finally, the process is complete in step 1507.

Figure 16:
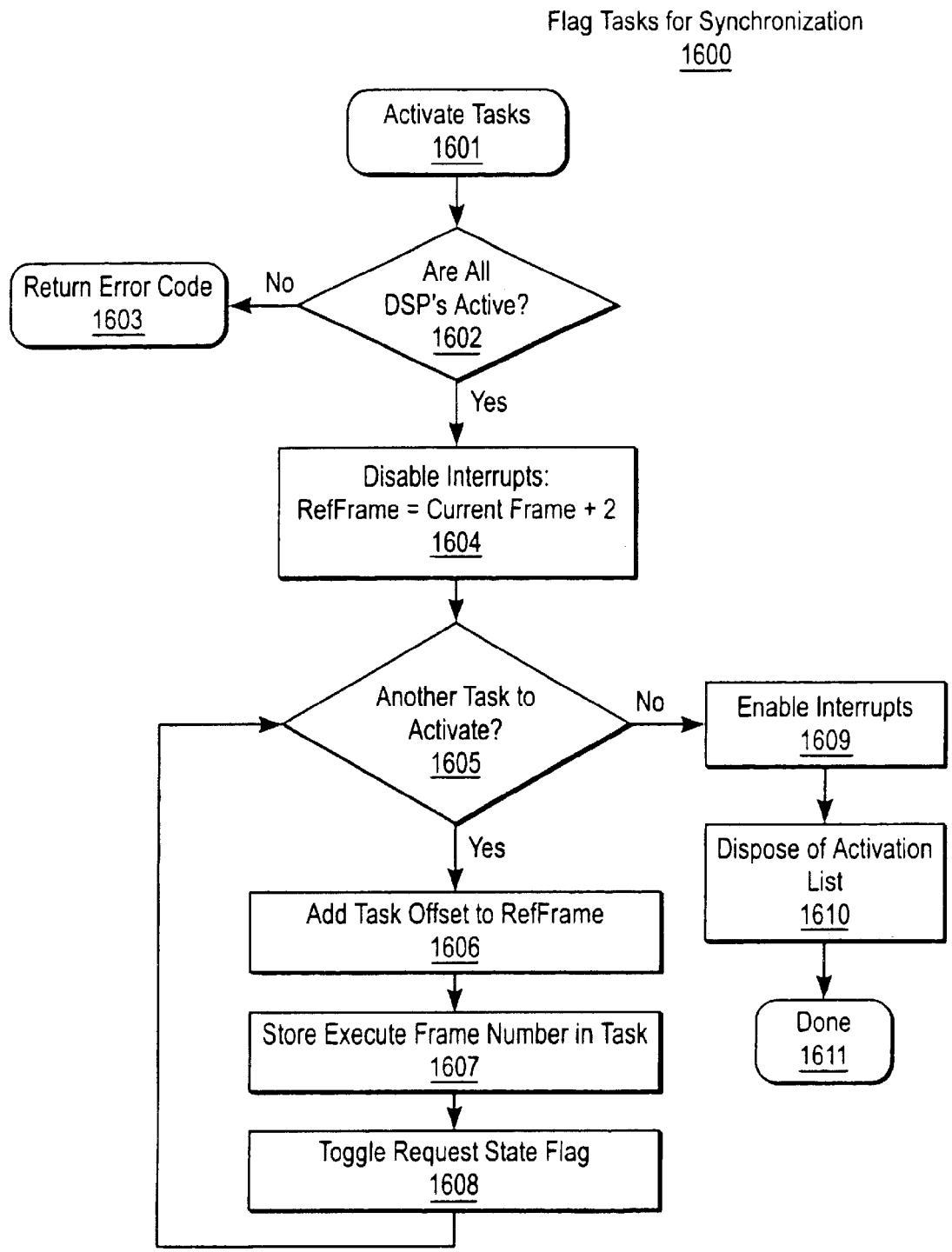
FIG. 16 shows a flow chart of the method of activating the sequence specified in FIG. 15.

The client calls the described routine as many times as required, setting up the activation list. When all the required tasks are added to the activation list, then the client makes a Task Activation call, shown in FIG. 16.

The activation routine entry point is shown as 1601. Step 1602 checks to see if all DSP's referenced in the current Activation List are running and are synchronized. This repeated check insures that the configuration was not changed during the time the client was setting up the activation list. If either of these two conditions exist, an error code is returned, step 1603.

Assuming no errors have been detected, step 1604 deactivates interrupts on the host, and calculates the Reference Frame Number. In the preferred embodiment, this is the current frame number plus 2. Having interrupts disabled and performing this simple calculation ensures that the first possible activation frame is far enough in the future that all task list modifications will be complete prior to that frame. The value 2 is used here rather than 1 because it is possible that the current frame number in shared memory will change immediately after the value is read by the host. If the first possible activation frame was the value read plus 1, and the number changes immediately after being read, the first activation frame is already under way, and a required activation may be missed. By adding 2 to the number of frames to delay the simultaneous start/stop, it can be assured that at least one whole frame will pass after the number is read and before the task update process must be completed.

Note that this mechanism is designed to provide the shortest possible interrupt disable time for the host. The list is structured in such a manner that scanning down the task lists and checking for tasks desired to be synchronized is not required during interrupt disable time.

In step 1605, we check to see if there are any more tasks to process in the Activation List. If so, we proceed to step 1606. Here, the offset value provided by the client is added to the Reference Frame Number. This gives us the Activation Frame Number for this task. In step 1607 we store this number in the task data structure for use by the DSP Kernel. In step 1608, we toggle the Requested State Flag. This flag indicates if the task should be active or inactive. It is a request flag, since its value does not indicate the actual state of the task. There is another flag, the State Flag, which only the Kernel can modify, which indicates the actual state of the task. The toggle convention is used in the preferred embodiment, because this allows the same mechanism to be used for either activation or deactivation of a task. However, separate flags can be used in an alternative embodiment, and this can be handled by the single call by requiring the client to pass a parameter indicating which state the process desires, or can be handled by separate calls, such as "Set Task to Activate" and "Set Task to Inactivate."

Once this Activation List element has been implemented, the process returns to step 1605 to check for additional items in the Activation List. If there are no more, the process proceeds to step 1609, otherwise, it returns to step 1606. Step 1606 through 1608 are repeated for each task in the Activation List.

In step 1609, interrupts for the host are re-enabled. In step 1610, the activation list is disposed of. Alternate embodiments may require the client to do this. Finally, the process is done in step 1611.

At this point, the client has completed all of the steps required to activate or deactivate a set of one or more tasks. Note that each step in the process does not require any waiting by the host—each call is immediately processed. This was another of the requirements for the mechanism: in a multi-tasking system, it is desirable to avoid idle loops waiting for some other process to complete. This eliminates wasted host processing.

This process is designed to complete at the latest well before the end of the frame preceding the first activation frame. This prevents any race conditions between the host and the DSP processors, and ensures a proper sequencing of tasks in time.

Figure 17:
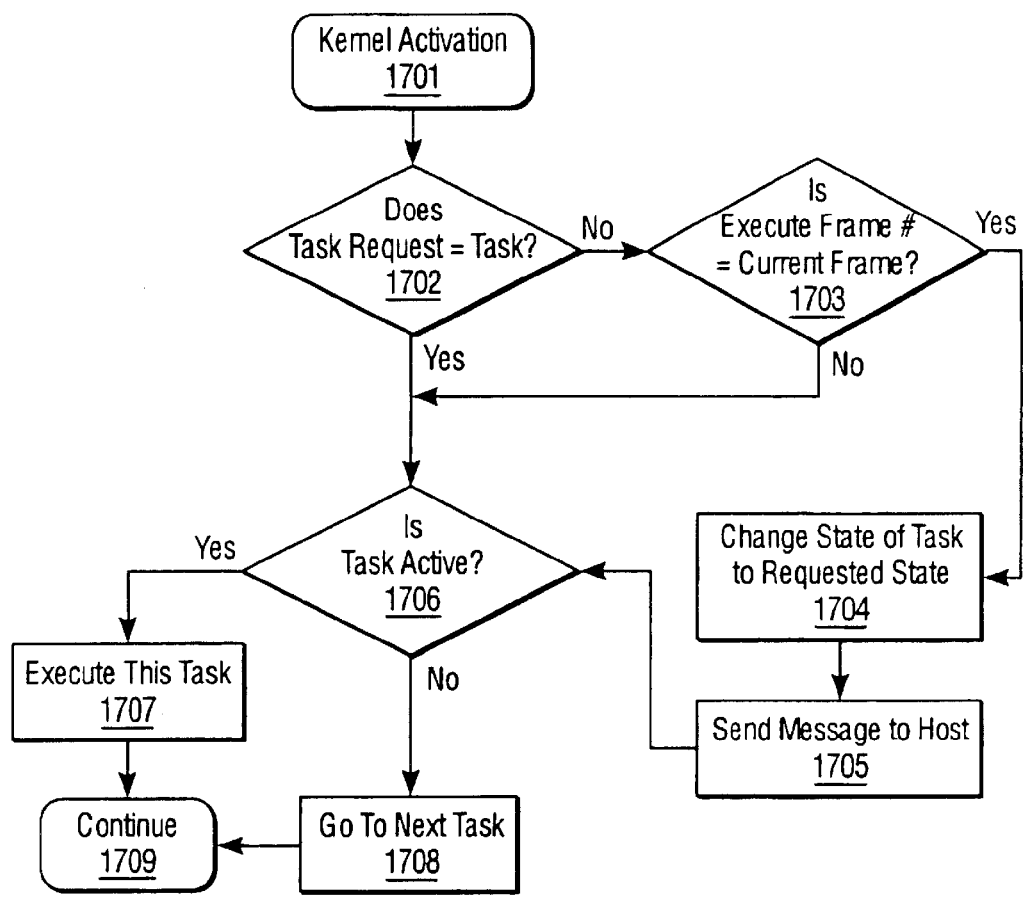
FIG. 17 shows a flow chart of the relevant portion of the DSP Kernel executive routine that actually carries out the task activation as set up in FIGS. 15 and 16.

The DSP Kernel Executive program is responsible for the sequencing of tasks on the DSP. The relevant portion of the Executive for handling the task activation/deactivation function is shown in FIG. 17.

The entry point for Kernel Activation event servicing is shown in step 1701. The Kernel compares the actual status of the task with the requested status in step 1702. If they are the same, the process continues to step 1706. If they are different, the process goes to step 1703. Step 1703 checks to see if the activation frame number is the same as (or less than) the current frame number. If it is, then processing continues with step 1704. Otherwise, processing continues to step 1706. Step 1704 changes the active status to be the same as the requested status. Step 1705 sends a message to the host to indicate that the activation or deactivation has been completed for this task. This step is important when power management is desirable, as in a portable application. This message allows the Power Manager, a part of DSP Manager 211, to determine when power can be reduced or eliminated in the DSP subsystem. This is possible because all task activations and deactivations are handled by this mechanism. Once the task activation or deactivation is complete, the process continues with step 1706.

Note that if the activation frame number is less than the current frame number, an activation error has occurred—i.e., the task should have been activated in an earlier frame. This should never happen in a properly configured system. However, in some embodiments, this error could be checked for and reported via a message to the DSP Manager and the task's client.

In step 1706, the Kernel determines if the current task is active or inactive. Note that the state may have just changed. If the task is inactive, processing continues with step 1708 by looking for the next task. Otherwise, step 1707 executes the current task. In either case, processing continues with step 1709. The activation process shown in FIG. 17 is repeated for each task in both the real-time and timeshare tasks lists.

Figure 18:
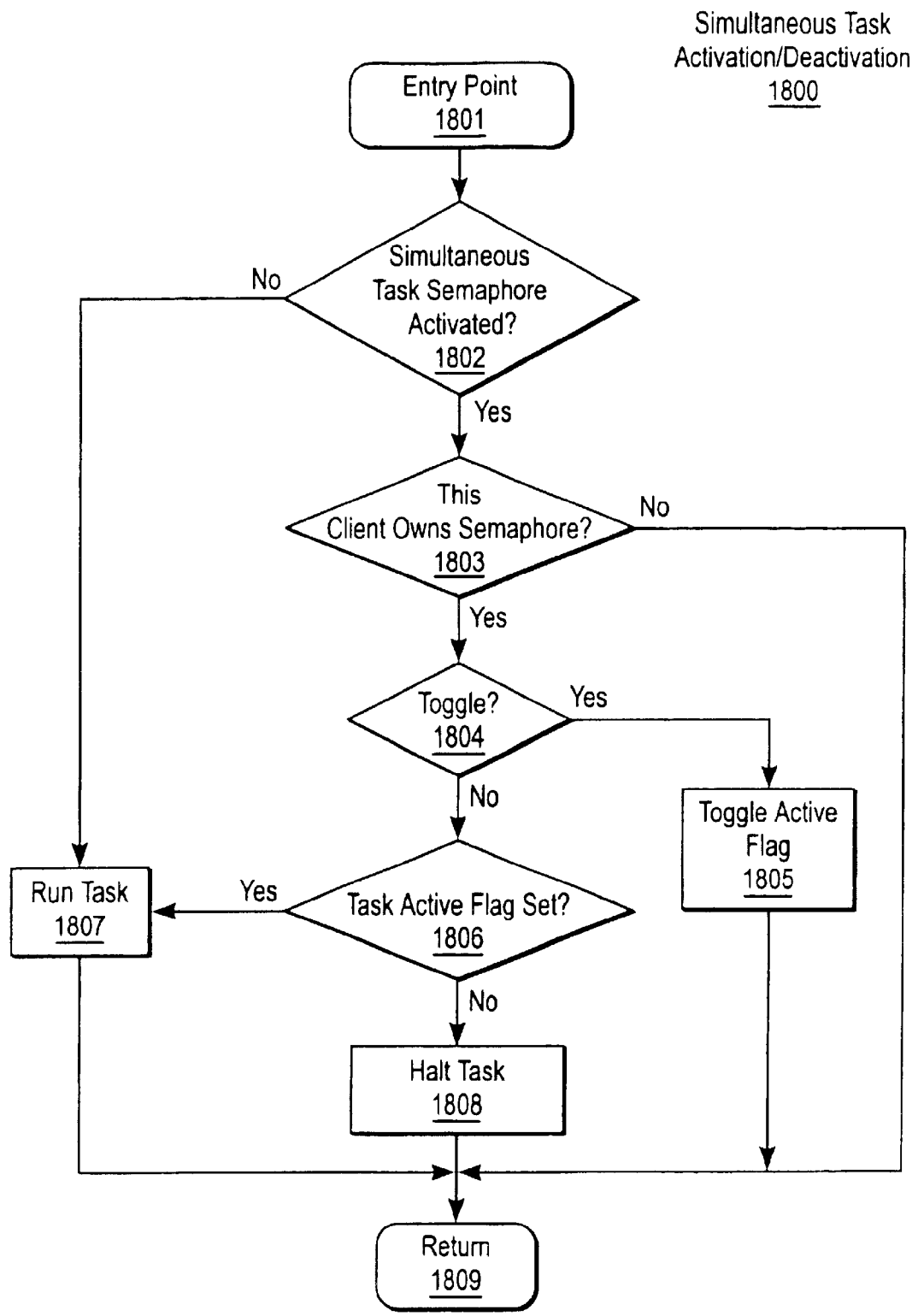
FIG. 18 shows a flowchart of an alternative task activation/deactivation process.

An alternative embodiment of simultaneous task activation/deactivation is shown in FIG. 18. Simultaneous task activation/deactivation process 1800 starts at entry point 1801 and it is determined at step 1802 whether the simultaneous task semaphore has been activated by one of the clients being serviced by the DSP. If the simultaneous task activation semaphore has not been activated by a client, then process 1800 proceeds to run the task at step 1807 and return at step 1809. However, if the simultaneous task activation/deactivation semaphore has been activated as determined at step 1802, then it is ascertained at step 1803 whether this client owns the semaphore. Any clients not owning the semaphore will be able to read the semaphore, however, they will not be able to modify the semaphore. Therefore, once a client owns the semaphore, and if a subsequent client seeks to access it, then step 1803 will lead to the end of process 1800 for this task. In short, the task is bypassed until the semaphore is either not activated as determined in step 1802, or it is determined that the client owns the semaphore.

If, however, the client checking the task activation semaphore does own the semaphore as determined at step 1803, then the toggle flag is checked at step 1804. The toggle flag instructs the DSP manager to "toggle" the state of the active flag. This is performed at step 1805. The active flag is used to activate the task. Thus, once a semaphore has been activated, the active flag will control the execution of the task. However, the execution of the task will only take place when the task active flag has been set. Otherwise, the task active flag is cleared, and task execution is halted. Therefore, the toggle flag provides a means for simultaneous task activation or deactivation depending on the state of the active flag. On a subsequent pass through process 1800, if the toggle is not set as determined at step 1804, then the task active flag is checked, and if set as determined at step 1806, then the task is run at step 1807, and process 1800 returns at step 1809. In a similar manner, once a task has been activated in a single frame as in a previous execution pass of process 1800, the task active flag can be toggled again as determined at step 1804 and performed at step 1805. Then, a subsequent pass through 1800 will determine if the task active flag is set at step 1806. If the task active flag is therefore cleared, then process 1800 will proceed to 1808 and the task execution will be halted. Then process 1800 may end at step 1809. At that point, the client may release the semaphore, and thus normal execution of all tasks in the real-time task list 610 may again be performed normally until another task obtains control of the task activation/deactivation semaphore.

Thus, a means for activating tasks simultaneously or in sequence in one or more task lists is provided by processes 1500, 1600, 1700, and 1800 as set forth above. Although this has been described with reference to specific flags and data structures, it can be appreciated by one skilled in the art that this may be implemented with various embodiments without departing from the spirit and scope of the present invention.

Thus, in summary, an improved method for task management in a processor has been provided. Although the present invention has been described particularly with reference to FIGS. 1 through 18, it will be apparent to one skilled in the art that the present invention has utility far exceeding that disclosed in the figures. It is contemplated that many changes and modifications may be made, by one of ordinary skill in the art, without departing from the spirit and scope of the present invention as disclosed above.

What is claimed is:

1. A method in a computer system of executing a first sequence of modules in a first task, said first sequence of modules linked to one another and having at least one sequence of execution, comprising:
   a. storing in each of said first sequence of modules a skip value indicating a next module in said first sequence of modules to execute;
   b. executing a first module of said first sequence of said modules; and c. executing said next module of said first sequence of modules indicated by the skip value stored in a currently executed module, skipping any module between the currently executed module and said next module, wherein each module of said first sequence of modules comprises at least one digital signal processing data structure.

2. The method of claim 1 wherein the skip value comprises the integer N which indicates that execution should skip to the N+1th module following execution of the currently executed module in the first sequence of modules.

3. The method of claim 2 wherein a skip value of N less than zero stored in the currently executed module indicates that execution of the first sequence of modules should terminate after completion of execution of the currently executed module.

4. The method of claim 1 further comprising executing elements a–c on a second sequence of modules, said second sequence of modules being a part of a second task.

5. The method of claim 1 farther comprising performing a skip action created on the previous iteration of the first sequence of modules.

6. The method of claim 1 wherein the skip value stored in each module in said first sequence of modules is modifiable by the respective module.

7. The method of claim 1 wherein the skip value stored in each module in said first sequence of modules is modifiable by a host associated with the first task.

8. A method of controlling execution flow of a first task comprising a first sequence of executable modules in a processing system by storing in each of said executable modules a skip count indicating a next module in said first sequence of modules to execute, said skip count comprising an integer N which indicates that execution should skip to the N+1th module following execution of a currently executed module in the first sequence of executable modules, skipping any module between the currently executed module and the N+1th module, a skip count of N less than zero stored in the currently executed module indicating that execution of the first sequence of modules should terminate after completion of execution of the currently executed module, wherein each module comprises at least one digital signal processing data structure.

9. A method performed by a processor of controlling the flow of execution of a first set of executable modules sequentially associated with one another comprising:
 a. executing a first module in said first sequence of modules;
 b. determining a skip value stored in said first module, said skip value indicating a module to execute subsequent to execution of said first module; and
 c. proceeding to execute a subsequent module in said first set of executable modules indicated by said skip value stored in a currently executed module, skipping any modules between the currently executed module and the subsequent module, wherein each module comprises at least one digital signal processing data structure.

10. The method of claim 9, wherein the skip value comprises the integer N, and the subsequent module is the N+1th module following the first module in said first sequence of modules.

11. The method of claim 10 wherein a skip value of N less than zero stored in said first module indicates that execution of said first sequence of modules should terminate after completion of execution of said first module.

12. The method of claim 9 further comprising:
 storing the skip value of each module of said first sequence of modules in said each module.

13. The method of claim 9 wherein the said skip value in each of said modules is modifiable by a host.

14. The method of claim 9 wherein the said skip value in each of said modules is modifiable by the respective.

15. An apparatus for executing a first sequence of modules in a first task, said first sequence of modules linked to one another and having at least one sequence of execution, comprising:
 a. means for storing in each of said first sequence of modules a skip value indicating a next module in said first sequence of modules to execute;
 b. means for executing a first module of said first sequence of said modules; and
 c. means for executing said next module of said first sequence of modules indicated by the skip value stored in a currently executed module, skipping any modules between the currently executed module and the next module, wherein each module comprises at least one digital signal processing data structure.

16. An apparatus for controlling the flow of execution of a first set of executable modules sequentially associated with one another comprising:
 a. means for executing a first module in said first sequence of modules;
 b. means for determining a skip value stored in said first module, said skip value indicating a module to execute subsequent to execution of said first module; and
 c. means for proceeding to execute a subsequent module in said first set of executable modules indicated by said skip value stored in a currently executed module, skipping any modules between the currently executed module and the subsequent module, wherein each module comprises at least one digital signal processing data structure.

17. A method of controlling the execution sequence of a series of modules by a processor, each of said modules associated with one another, comprising:
 a. executing the first in said series of modules;
 b. determining a skip value N stored in said first in said series of said modules;
 c. if the skip value N stored in said first module is less than zero, then terminating the execution of said series of modules;
 d. else if the skip value N stored in said first module is greater than or equal to zero then proceeding to a N+1th module in said series of said modules, skipping any module between the first module and the N+1th module, wherein each of said modules comprises at least one digital signal processing data structure.

18. A method in a computer system of performing a first sequence of modules in a first task, said first sequence of modules linked to one another and having at least one sequence of execution, comprising:
 a. storing in a first module of said first sequence of modules a skip value N representing a subsequent module in said first sequence of modules to execute, said skip value N comprising either:
  i. an integer less than zero indicating that said first module is a last executable module to be executed in said first sequence of modules;
  ii. an integer greater than or equal to zero indicating that said process should proceed to said N+1th module subsequent to said first module in said first sequence of said modules, skipping any module between the first module and the N+1th module;

b. executing the first of said first sequence of said modules; and c. executing the subsequent module in said first sequence of said modules indicated by said skip value stored in a currently executed module, wherein each module of said first sequence of modules comprises at least one digital signal processing data structure.

19. The method of claim 17, further comprising:

storing the skip value in said first in said series of said modules.

20. A machine-readable medium having executable instructions to cause a machine to control a flow of execution of a first set of executable modules sequentially associated with one another comprising:

executing a first module in said first set of executable modules, wherein each module comprises at least one digital signal processing data structure; and executing a subsequent module in first set of executable modules indicated by a skip value stored in a currently executed module, skipping any modules between the currently executed module and the subsequent module.

21. The machine-readable medium of claim 20 further comprising:

storing the skip value of each module of said first set of executable modules in each module of said first set of modules.

22. The machine-readable medium of claim 20, further comprising:

modifying the skip value in each of said modules by a host.

23. The machine-readable medium of claim 20, further comprising:

modifying the skip value in each of said modules by the respective module.

24. The machine-readable medium of claim 20, wherein the first set of modules forms a first task and further comprising:

performing the instructions against a second sequence of modules, said second sequence of modules being part of a second task.

25. The machine-readable medium of claim 20 further comprising:

performing a skip action created on a previous iteration of the first set of executable modules.

26. The machine-readable medium of claim 20, wherein the skip value comprises an integer N and the subsequent module is the N+1th module following the first module in said first sequence of executable modules, and wherein a value of N less than zero associated with the currently executed module indicates that execution of said first set of executable modules should terminate after completion of execution of the currently executed module.

* * * * *

UNITED STATES PATENT AND TRADEMARK OFFICE
CERTIFICATE OF CORRECTION

PATENT NO. : 6,854,116 B1 Page 1 of 1
DATED : February 8, 2005
INVENTOR(S) : Anderson et al.

It is certified that error appears in the above-identified patent and that said Letters Patent is hereby corrected as shown below:

Title page,
Item [54], Title, should read -- EXECUTION CONTROL FOR PROCESSOR TASKS. --

Signed and Sealed this

Thirty-first Day of May, 2005

JON W. DUDAS
*Director of the United States Patent and Trademark Office*

UNITED STATES PATENT AND TRADEMARK OFFICE
CERTIFICATE OF CORRECTION

PATENT NO.    : 6,854,116 B1
DATED         : February 8, 2005
INVENTOR(S)   : Anderson et al.

It is certified that error appears in the above-identified patent and that said Letters Patent is hereby corrected as shown below:

<u>Title page,</u>
Item [63], Related U.S. Application Data, please delete "which is a continuation of application No. 07/954,970" and replace with -- which is a divisional of application No. 07/954,970 --.

Signed and Sealed this

Eleventh Day of October, 2005

JON W. DUDAS
*Director of the United States Patent and Trademark Office*